June 12, 1951   D. E. BRANSON ET AL   2,556,958
TRANSLATOR CIRCUIT

Filed Feb. 10, 1948   20 Sheets-Sheet 1

Figure 7:
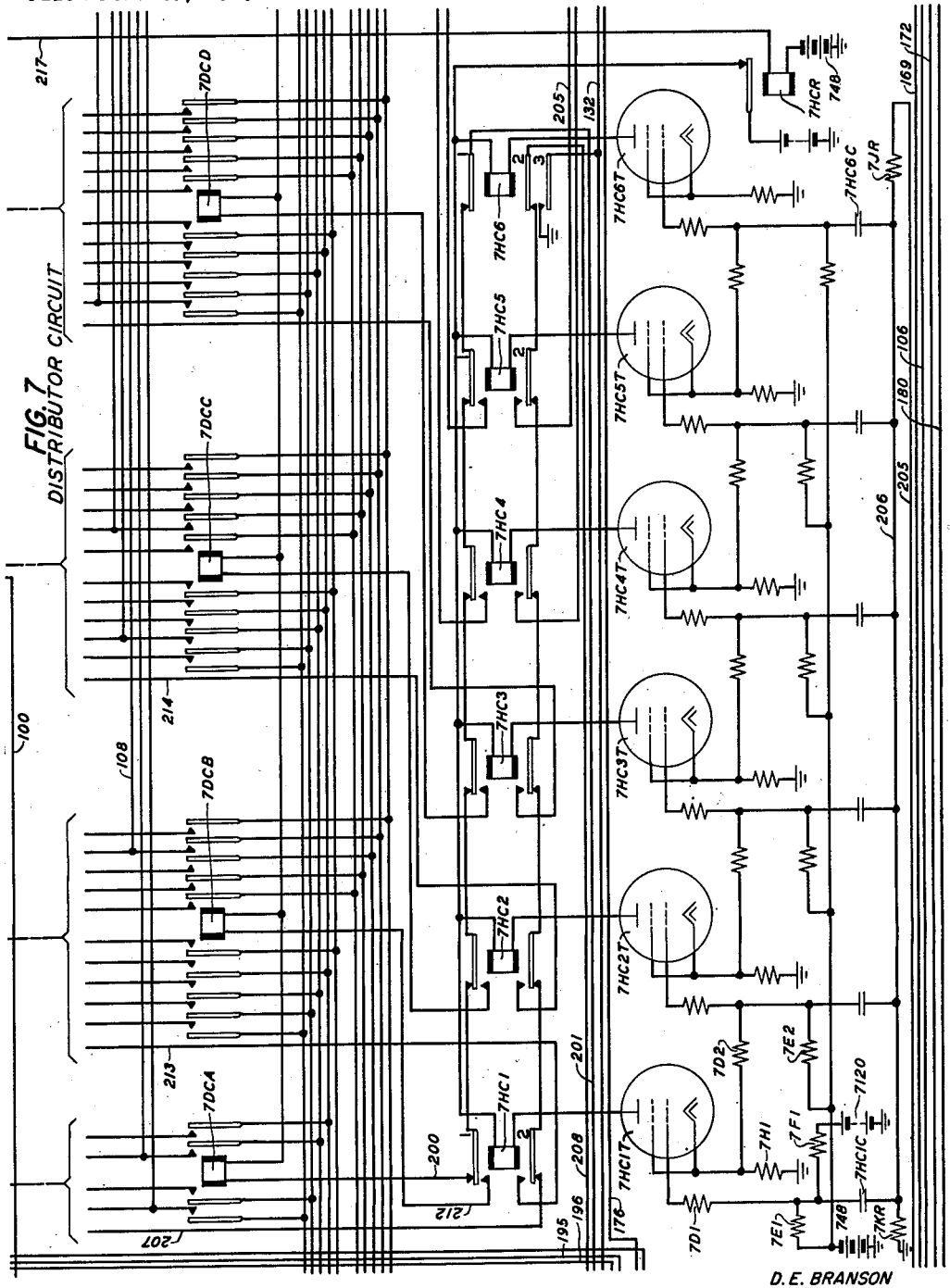
Figure 8:
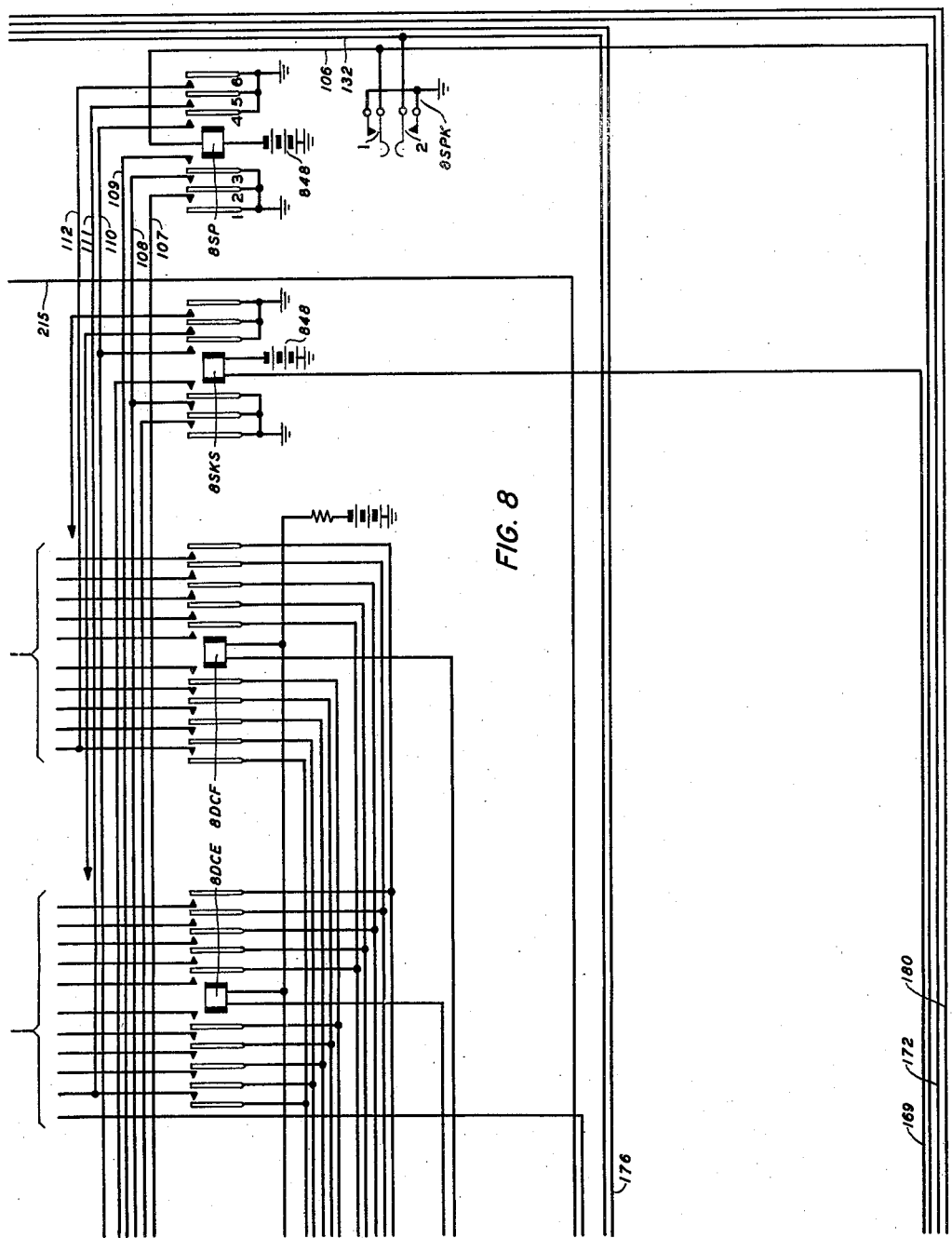
Figure 13:
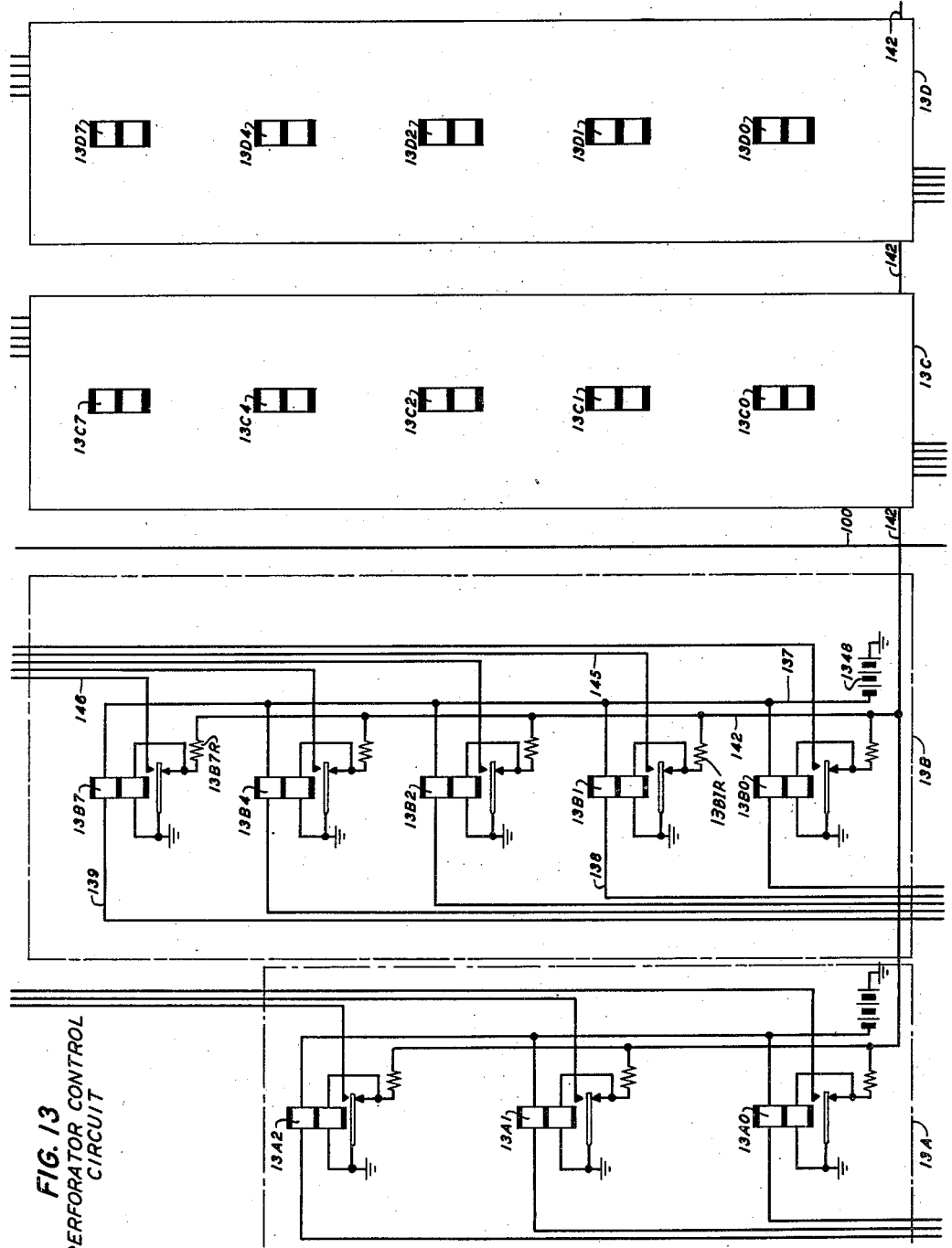
Figure 14:
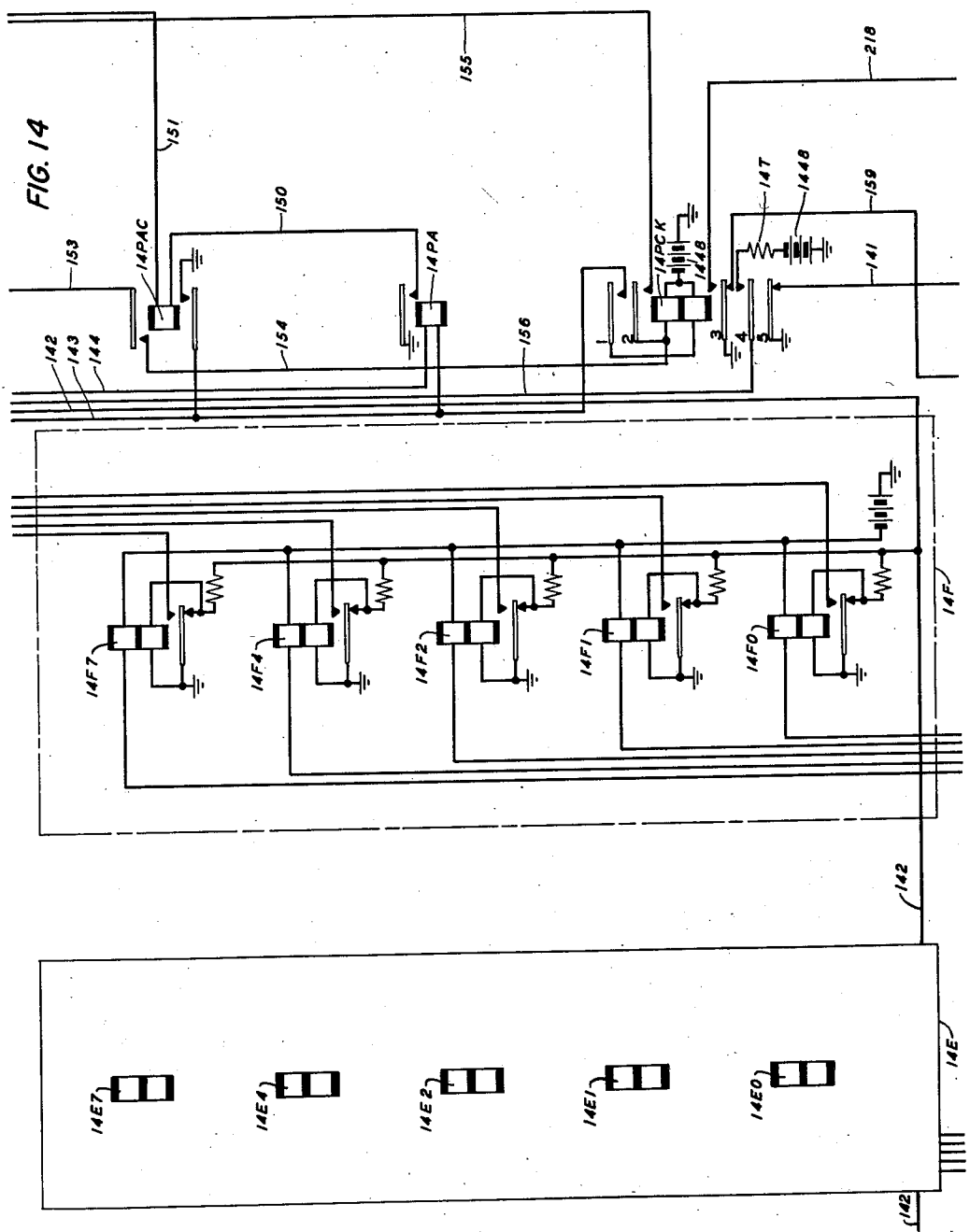
Figure 15:
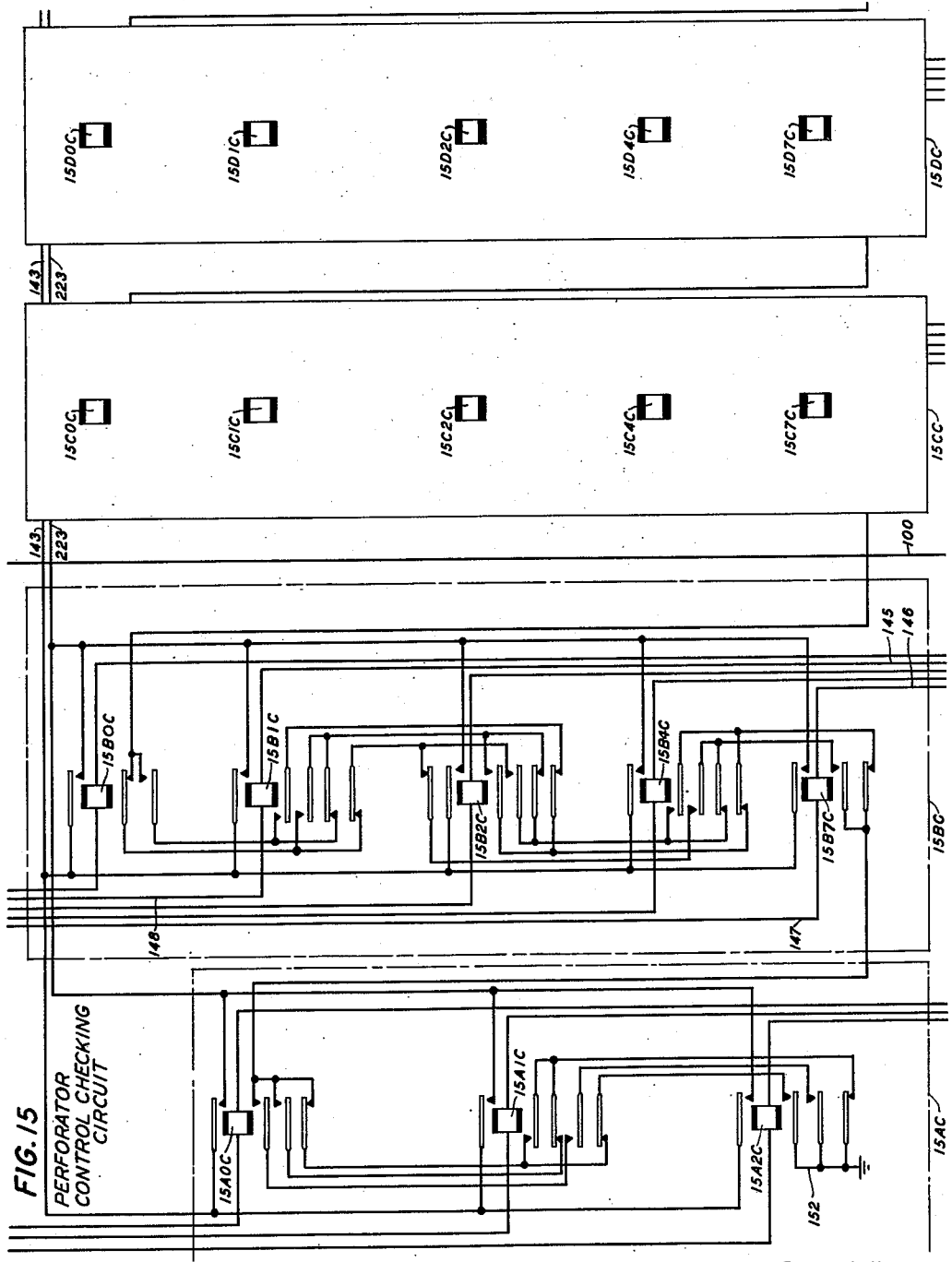
Figure 16:
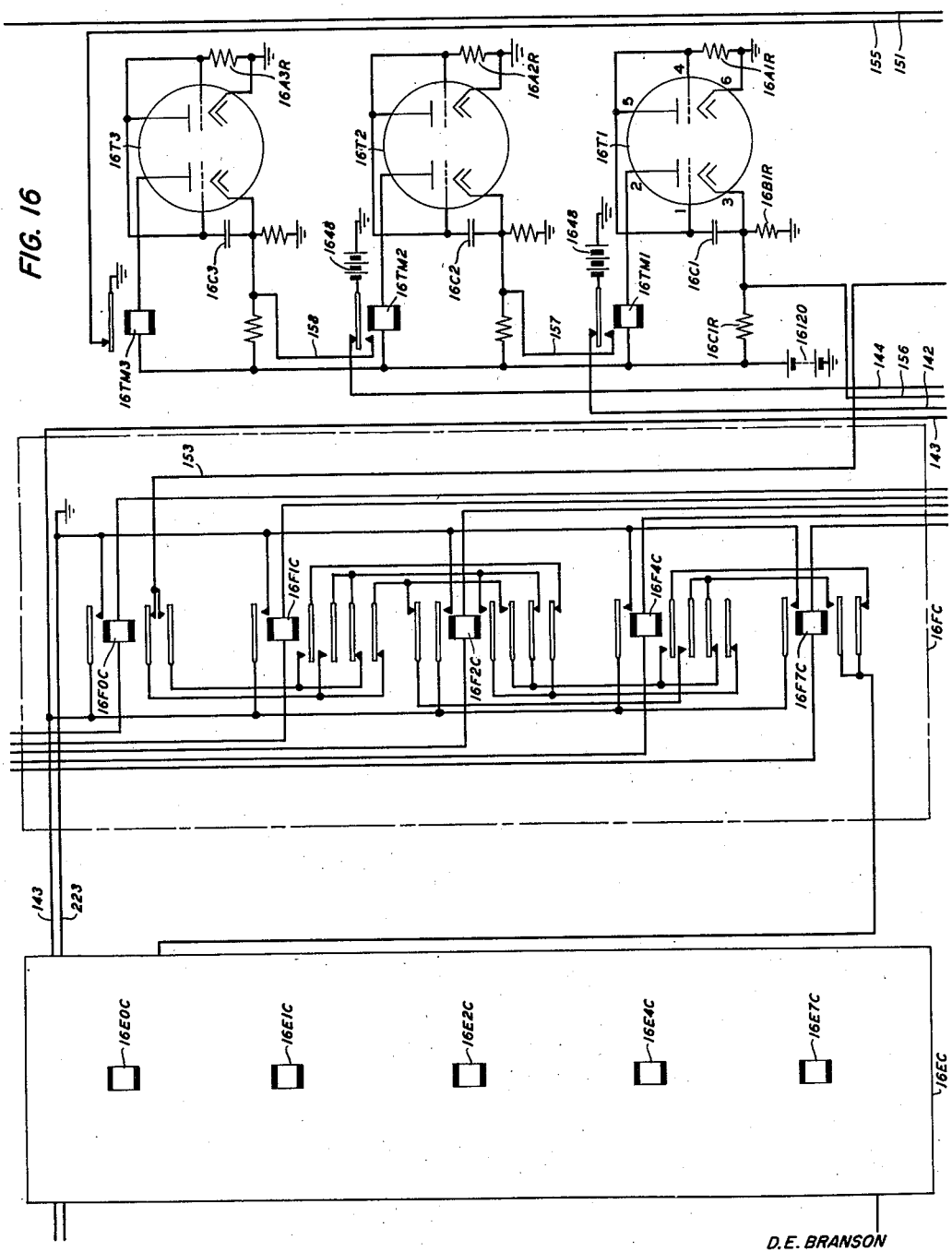
Figure 17:
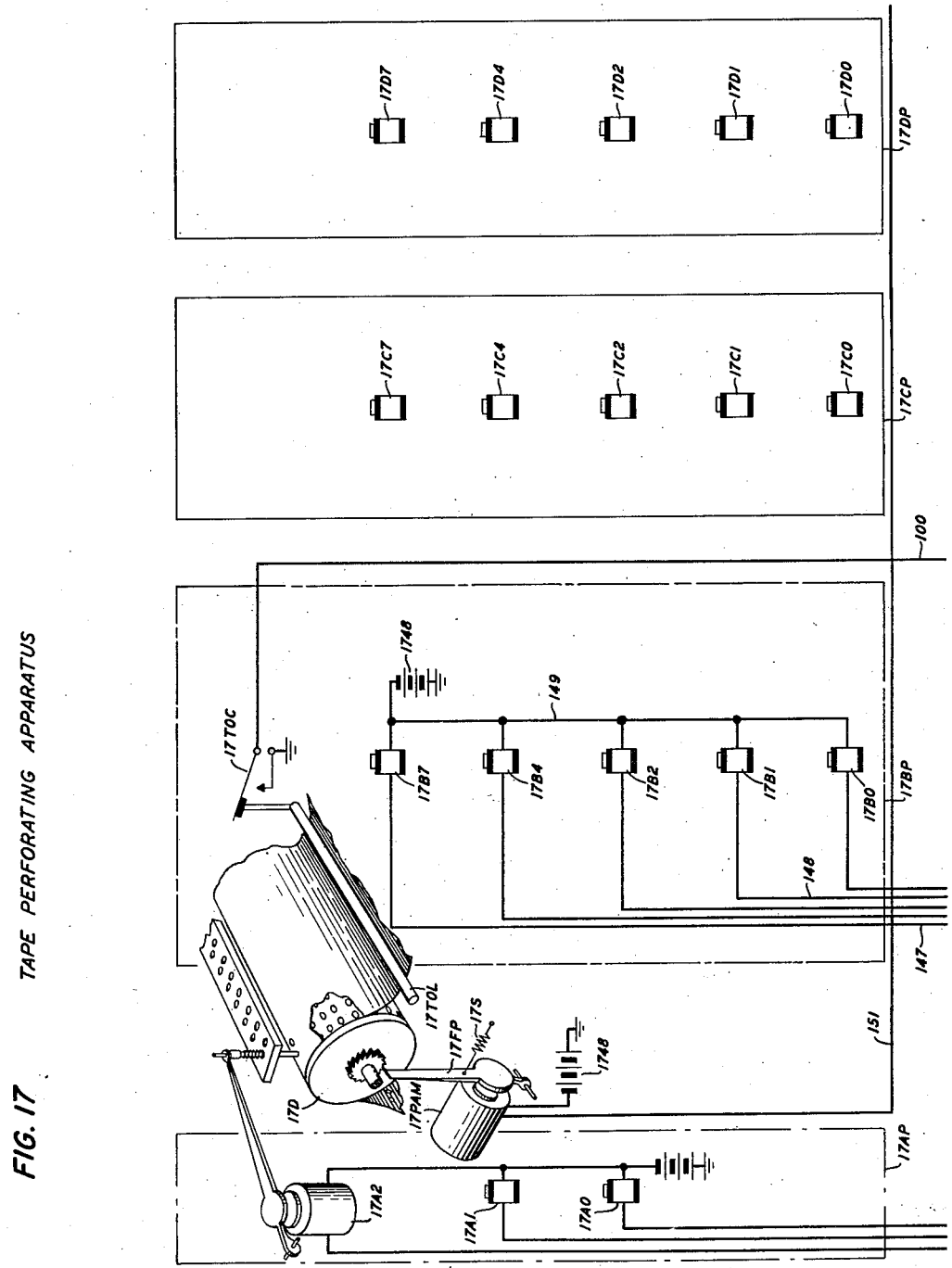
Figure 18:
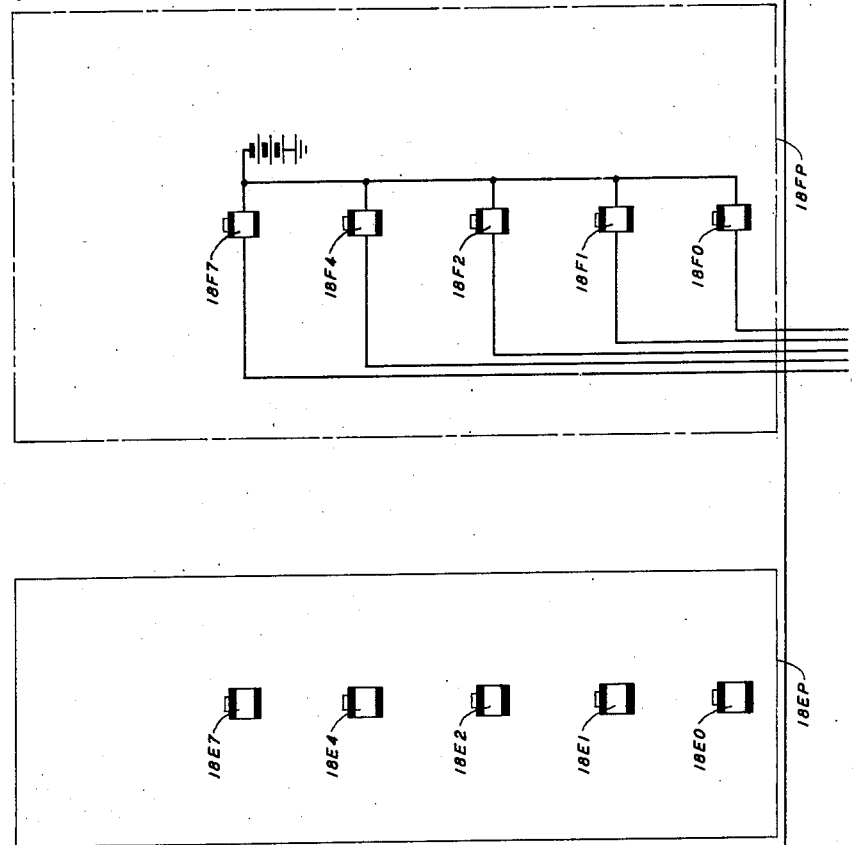

| FIG. 18 | FIG. 16 | FIG. 14 | FIG. 12 | FIG. 10 | FIG. 8 |
|---------|---------|---------|---------|---------|--------|
| FIG. 17 | FIG. 15 | FIG. 13 | FIG. 11 | FIG. 9  | FIG. 7 |

| FIG. 2 | FIG. 3 | FIG. 4 |

INVENTORS
D. E. BRANSON
J. R. DAVEY
G. J. KNANDEL
G. A. LOCKE
R. A. VANDERLIPPE

BY J. W. Schmied
ATTORNEY

June 12, 1951 — D. E. BRANSON ET AL — 2,556,958
TRANSLATOR CIRCUIT
Filed Feb. 10, 1948 — 20 Sheets-Sheet 2
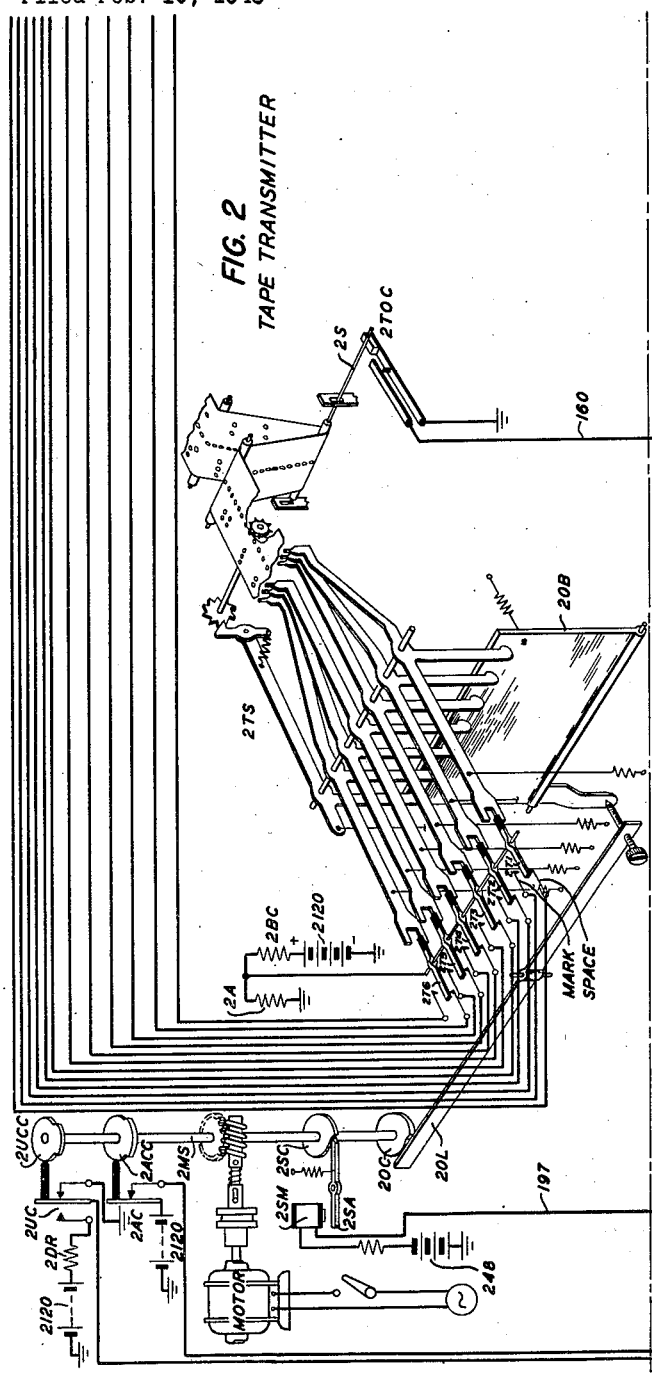
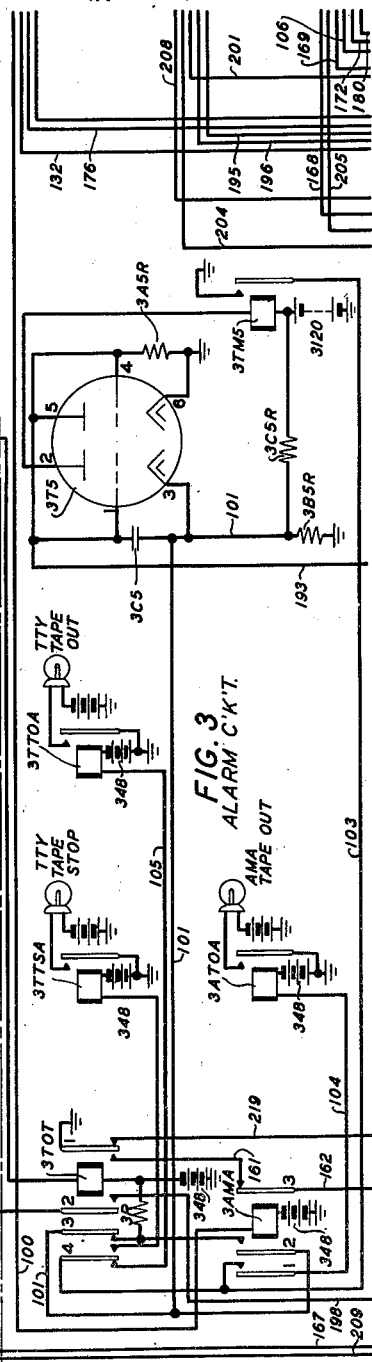
INVENTORS
D. E. BRANSON
J. R. DAVEY
G. J. KNANDEL
G. A. LOCKE
R. A. VANDERLIPPE
BY J. W. Schmied
ATTORNEY

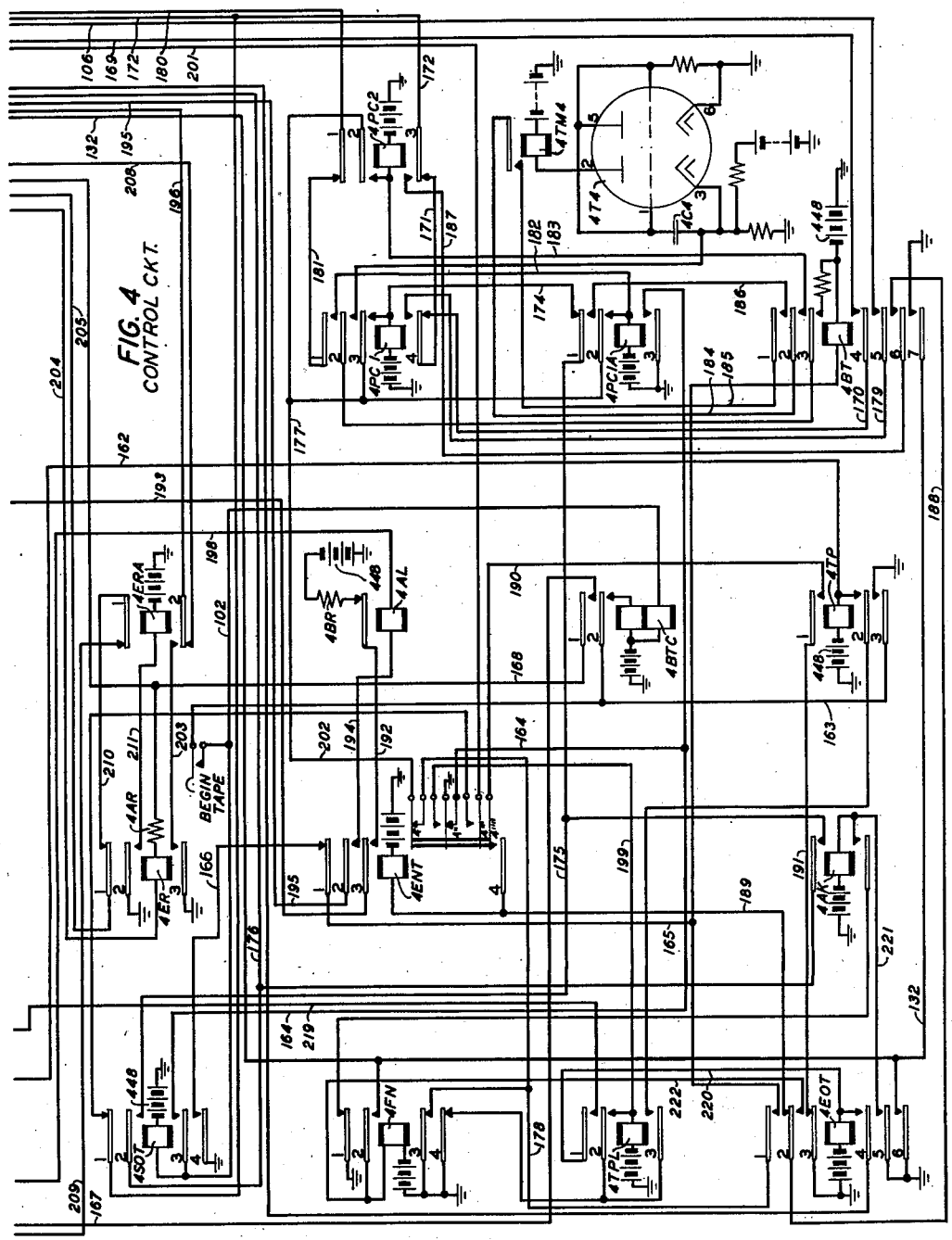

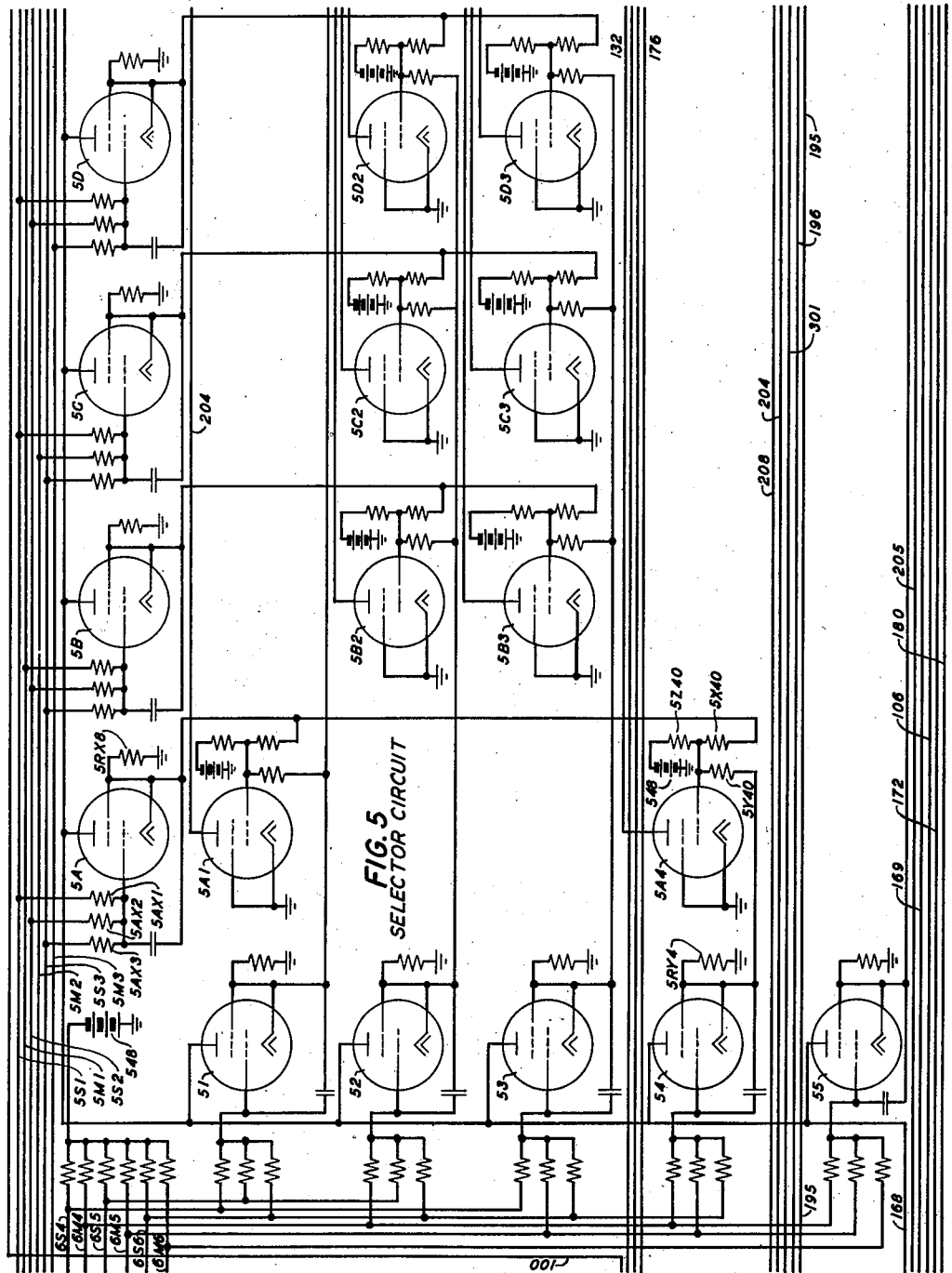

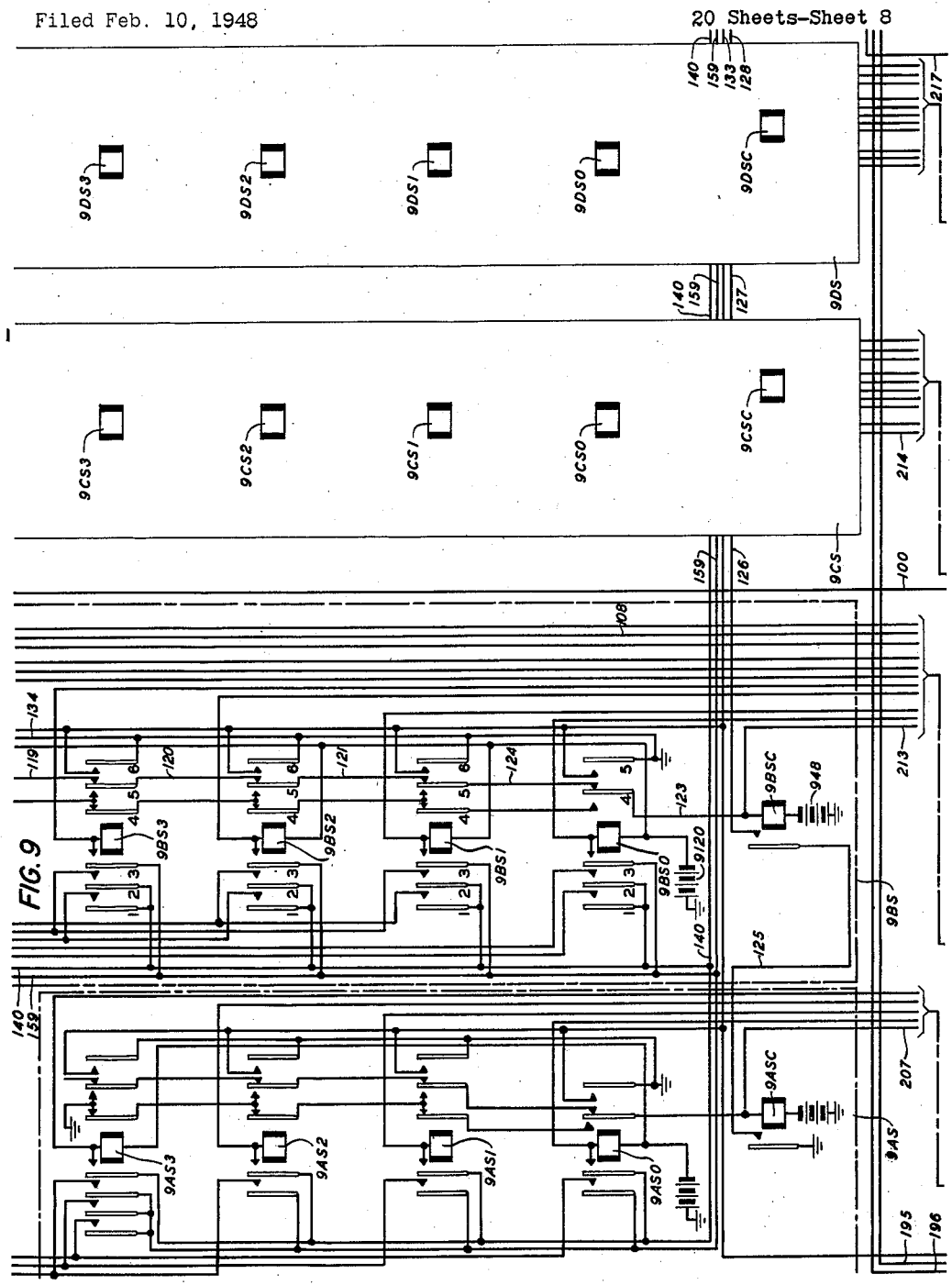

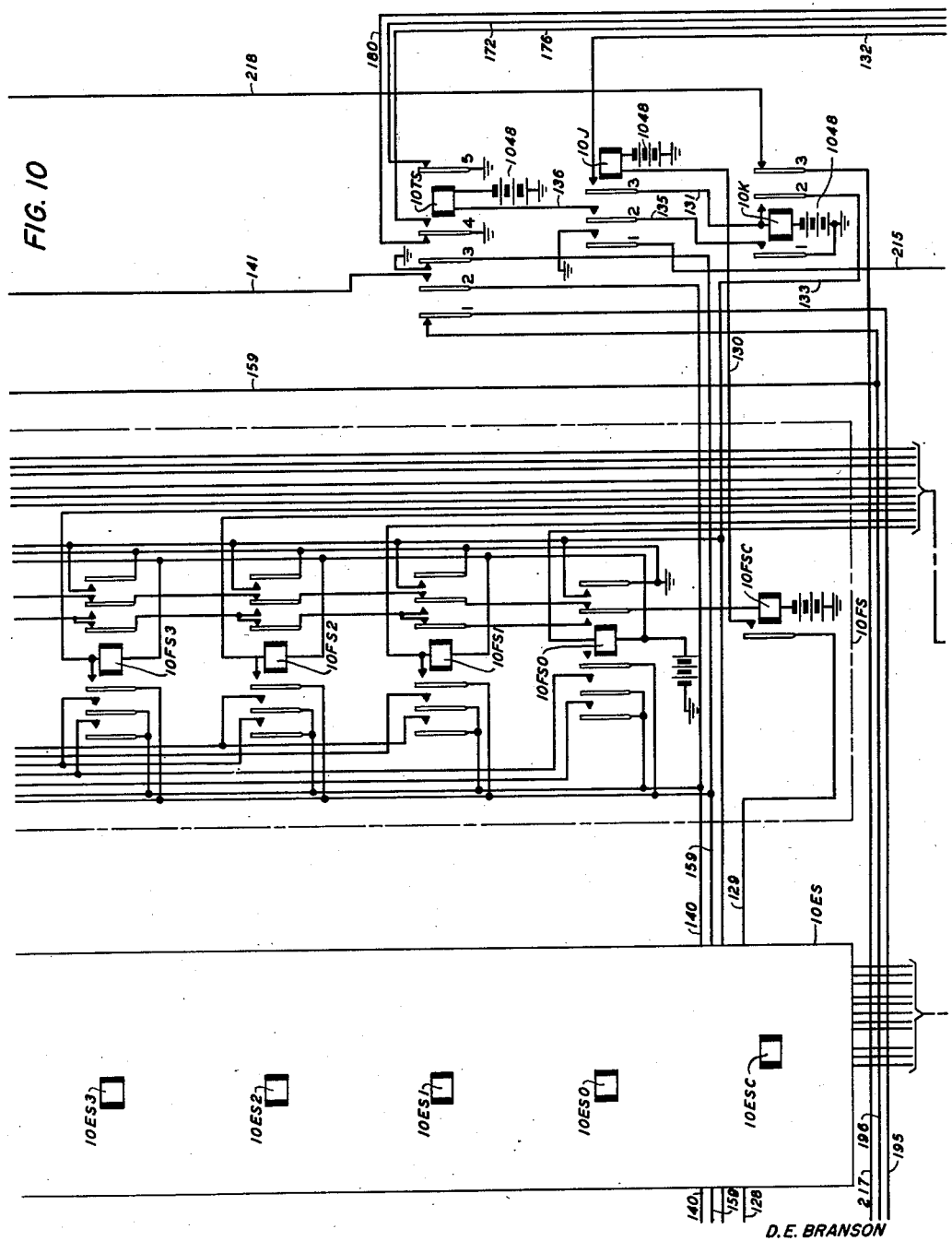

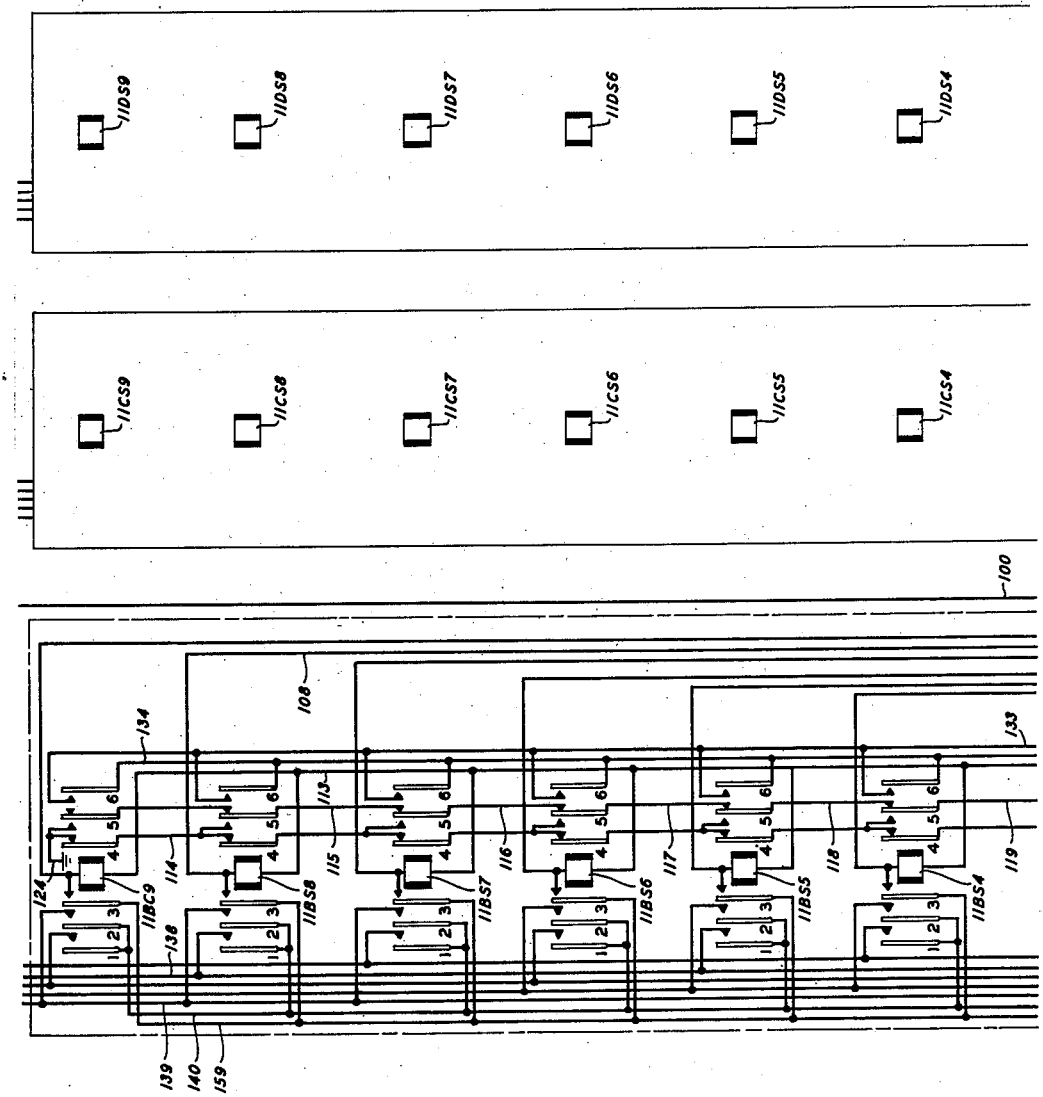

June 12, 1951   D. E. BRANSON ET AL   2,556,958
TRANSLATOR CIRCUIT
Filed Feb. 10, 1948   20 Sheets—Sheet 11
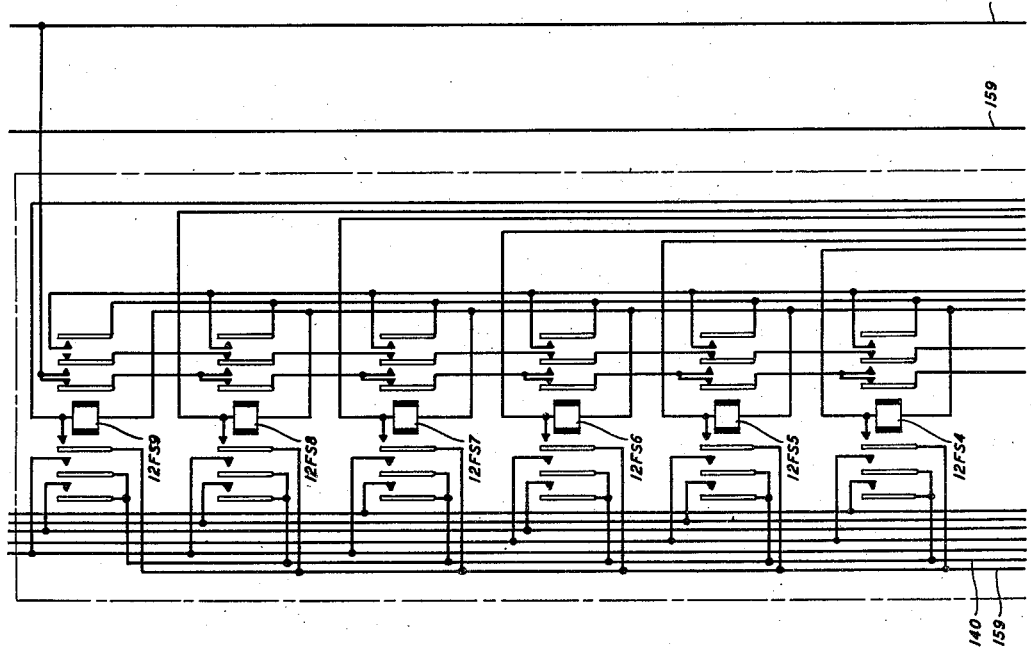
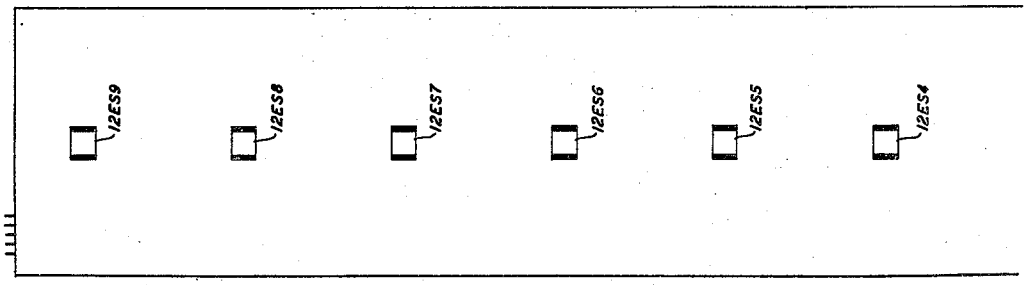
INVENTORS
D. E. BRANSON
J. R. DAVEY
G. J. KNANDEL
G. A. LOCKE
R. A. VANDERLIPPE
BY J. W. Schmiel
ATTORNEY

PERFORATOR CONTROL CIRCUIT

INVENTORS
D. E. BRANSON
J. R. DAVEY
G. J. KNANDEL
G. A. LOCKE
R. A. VANDERLIPPE

BY J. W. Schmied
ATTORNEY

FIG. 17 TAPE PERFORATING APPARATUS

June 12, 1951   D. E. BRANSON ET AL   2,556,958
TRANSLATOR CIRCUIT

Filed Feb. 10, 1948   20 Sheets-Sheet 17

INVENTORS
D.E. BRANSON
J.R. DAVEY
G.J. KNANDEL
G.A. LOCKE
R.A. VANDERLIPPE

BY
ATTORNEY

June 12, 1951   D. E. BRANSON ET AL   2,556,958
TRANSLATOR CIRCUIT

Filed Feb. 10, 1948   20 Sheets-Sheet 18

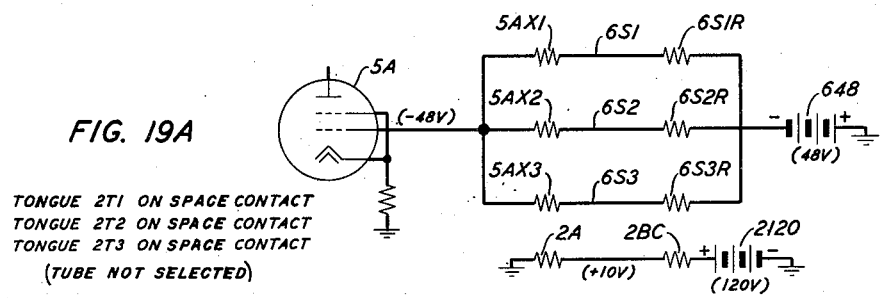

FIG. 19A

TONGUE 2T1 ON SPACE CONTACT
TONGUE 2T2 ON SPACE CONTACT
TONGUE 2T3 ON SPACE CONTACT
(TUBE NOT SELECTED)

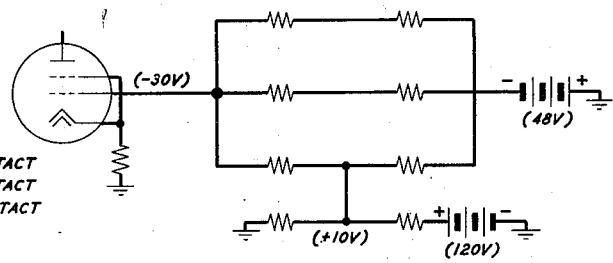

FIG. 19B

TONGUE 2T1 ON SPACE CONTACT
TONGUE 2T2 ON SPACE CONTACT
TONGUE 2T3 ON MARK CONTACT
(TUBE NOT SELECTED)

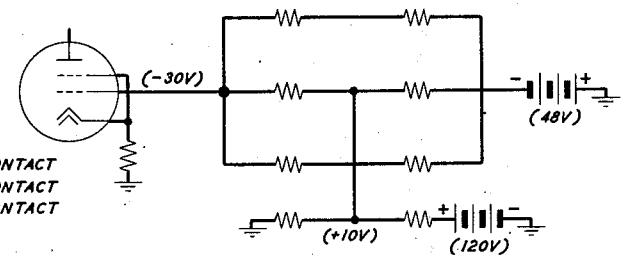

FIG. 19C

TONGUE 2T1 ON SPACE CONTACT
TONGUE 2T2 ON MARK CONTACT
TONGUE 2T3 ON SPACE CONTACT
(TUBE NOT SELECTED)

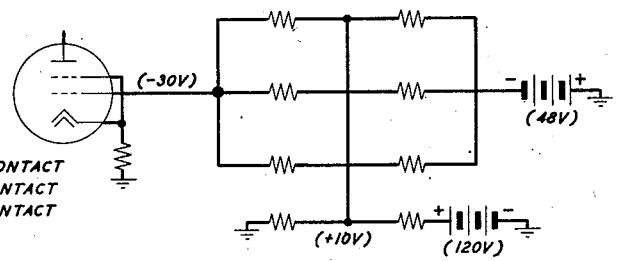

FIG. 19D

TONGUE 2T1 ON MARK CONTACT
TONGUE 2T2 ON SPACE CONTACT
TONGUE 2T3 ON SPACE CONTACT
(TUBE NOT SELECTED)

INVENTORS
D. E. BRANSON
J. R. DAVEY
G. J. KNANDEL
G. A. LOCKE
R. A. VANDERLIPPE

BY
J. W. Schmied
ATTORNEY

June 12, 1951  D. E. BRANSON ET AL  2,556,958
TRANSLATOR CIRCUIT

Filed Feb. 10, 1948  20 Sheets-Sheet 19

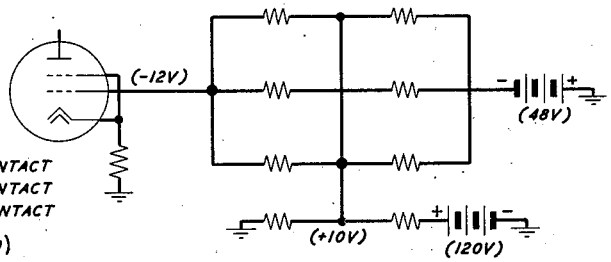

FIG. 20A

TONGUE 2T1 ON SPACE CONTACT
TONGUE 2T2 ON SPACE CONTACT
TONGUE 2T3 ON MARK CONTACT (TUBE NOT SELECTED)

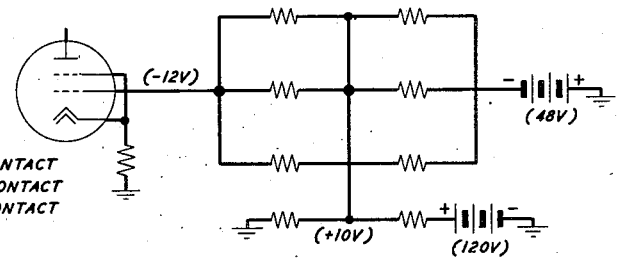

FIG. 20B

TONGUE 2T1 ON MARK CONTACT
TONGUE 2T2 ON MARK CONTACT
TONGUE 2T3 ON SPACE CONTACT (TUBE NOT SELECTED)

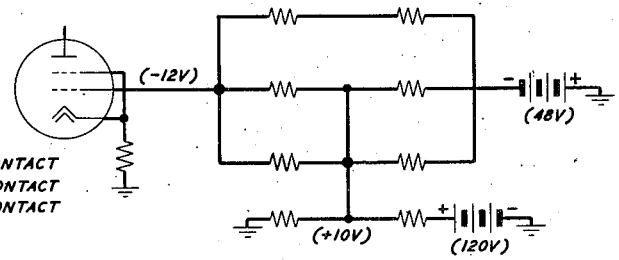

FIG. 20C

TONGUE 2T1 ON SPACE CONTACT
TONGUE 2T2 ON MARK CONTACT
TONGUE 2T3 ON MARK CONTACT (TUBE NOT SELECTED)

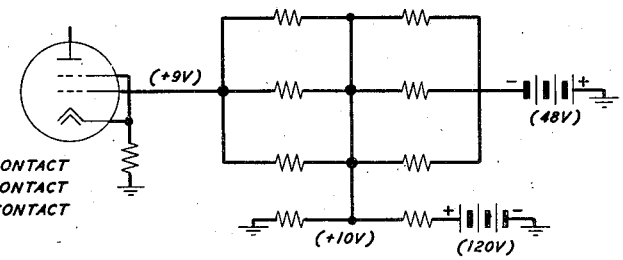

FIG. 20D

TONGUE 2T1 ON MARK CONTACT
TONGUE 2T2 ON MARK CONTACT
TONGUE 2T3 ON MARK CONTACT (TUBE SELECTED)

INVENTORS
D. E. BRANSON
J. R. DAVEY
G. J. KNANDEL
G. A. LOCKE
R. A. VANDERLIPPE

BY
J. W. Schmied.
ATTORNEY

June 12, 1951  D. E. BRANSON ET AL  2,556,958
TRANSLATOR CIRCUIT
Filed Feb. 10, 1948  20 Sheets—Sheet 20

FIG. 21A

AMA-5 POSITION CODE FOR DIGITS "B" TO "F" INCL.

| DIGIT | PUNCH POSITION | | | | |
|---|---|---|---|---|---|
|  | 1 | 2 | 3 | 4 | 5 |
| 0 | ○ | ○ | ○ | ● | ● |
| 1 | ● | ● | ○ | ○ | ○ |
| 2 | ● | ○ | ● | ○ | ○ |
| 3 | ○ | ● | ● | ○ | ○ |
| 4 | ● | ○ | ○ | ● | ○ |
| 5 | ○ | ● | ○ | ● | ○ |
| 6 | ○ | ○ | ● | ● | ○ |
| 7 | ● | ○ | ○ | ○ | ● |
| 8 | ○ | ● | ○ | ○ | ● |
| 9 | ○ | ○ | ● | ○ | ● |

FIG. 21B

AMA-3 POSITION CODE FOR "A" DIGIT

| DIGIT | PUNCH POSITION | | |
|---|---|---|---|
|  | 1 | 2 | 3 |
| 0 | ● | ○ | ○ |
| 1 | ○ | ● | ○ |
| 2 | ○ | ○ | ● |
| 3 | ● | ● | ● |

FIG. 21C

6 DIGIT TELETYPE CODE

| DIGIT | PUNCH POSITION | | | | | |
|---|---|---|---|---|---|---|
|  | 1 | 2 | 3 | 4 | 5 | 6 |
| 0 | ○ | ○ | ○ | ● | ● | ○ |
| 1 | ● | ● | ○ | ○ | ○ | ○ |
| 2 | ● | ○ | ● | ○ | ○ | ○ |
| 3 | ○ | ● | ● | ○ | ○ | ○ |
| 4 | ● | ○ | ○ | ● | ○ | ○ |
| 5 | ○ | ● | ○ | ● | ○ | ○ |
| 6 | ○ | ○ | ● | ● | ○ | ○ |
| 7 | ● | ○ | ○ | ○ | ● | ○ |
| 8 | ○ | ● | ○ | ○ | ● | ○ |
| 9 | ○ | ○ | ● | ○ | ● | ○ |
| BLANK | ○ | ○ | ○ | ○ | ○ | ○ |
| ERASE | ● | ● | ● | ● | ● | ● |

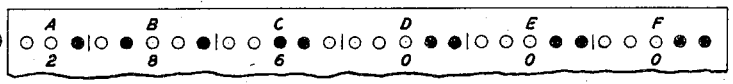

FIG. 21D — SKIP SPLICE

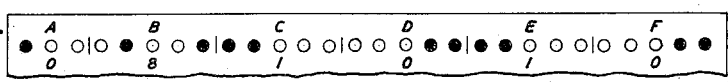

FIG. 21E — SPLICE PATTERN

INVENTORS
D. E. BRANSON
J. R. DAVEY
G. J. KNANDEL
G. A. LOCKE
R. A. VANDERLIPPE

BY J. W. Schmied
ATTORNEY

Patented June 12, 1951

2,556,958

UNITED STATES PATENT OFFICE 2,556,958

TRANSLATOR CIRCUIT

David E. Branson, River Edge, N. J., James R. Davey, New York, N. Y., George J. Knandel, Glen Rock, N. J., George A. Locke, Glenwood Landing, N. Y., and Richard A. Vanderlippe, Bloomfield, N. J., assignors to Bell Telephone Laboratories, Incorporated, New York, N. Y., a corporation of New York Application February 10, 1948, Serial No. 7,498

6 Claims. (Cl. 178—2)

This invention relates to code translators, and more particularly to translators for translating representations of characters expressed in one system of coding to representations of characters expressed in a different system of coding.

An object of this invention is to provide apparatus for converting information recorded as representations of characters expressed in a first system of coding into information recorded as representations of characters expressed in a second system of coding wherein one line of the representations of characters in the second system of coding represents a plurality of characters as recorded in the first system of coding.

Another object of this invention is to provide apparatus for converting information represented by a first system of coding into information represented by a second system of coding wherein the first system of coding comprises one combinational code and the second system of coding comprises a plurality of combinational codes.

A further object of this invention is to provide means for interposing predetermined representations of characters on the record containing the translated information.

Other objects and advantages which are within the scope of the invention will appear from the following detailed description, taken in conjunction with the appended drawings, wherein:

Fig. 1 shows how Figs. 2 to 18, inclusive, may be placed to form a complete circuit diagram;

Fig. 2 indicates the tape transmitter and the apparatus which serves to control the sequence of operations in the translating apparatus;

Figs. 3 to 16, inclusive, indicate the translating apparatus;

Figs. 17 and 18 indicate the apparatus which serves to record the translated information as perforations on tape;

Figs. 19 and 20 show a partial disclosure of the discriminator circuit to illustrate the voltage divider arrangement incorporated in the selector circuit; and Figs. 21A, 21B, 21D and 21E show representative examples of the two systems of coding on the AMA tape, while Fig. 21C shows the 6-digit teletype code used in connection with the operation of the invention.

In order to facilitate the tracing of circuit operations, each item of apparatus indicated in Figs. 2 to 18 is designated by a functional designation, consisting primarily of letters, which is preceded by the number of the figure in which said item appears. Thus, an item of apparatus mentioned in the text may readily be found in the drawings by reference to the figure number included in the designation of said item. The conductors are designated by numerals beginning with 100 and no attempt is made to associate these numerical designations with the various figure numbers.

DESCRIPTION

One situation wherein the occasion arises to translate representations of characters expressed in one system of coding to representations of characters expressed in a different system of coding is in a telephone company accounting office in which automatic billing machines are used and in which the information required to compute a subscriber's bill for local and toll services is received from the telephone exchange in the form of data recorded as perforations in tape representing characters expressed in a combinational 3- and 5-unit permutation code. In such a situation it is desirable for the accounting office to be able to convert all the information relating to the computation of the subscriber's bill into code characters representing the same system of coding and perforated in the same type tape as that utilized in the telephone exchange. For example, the information from the telephone exchange relating to long distance services for which the subscriber is to be charged, might be received by the accounting office in the form of writing on slips of paper prepared by telephone operators. In order to convert this handwritten information into perforations representing the same system of coding in the same type tape as that utilized in the telephone exchange, it might be desirable to have an operator convert the written information into permutation code perforations in teletypewriter tape and then translate the representations of characters on the teletypewriter tape into representations of characters expressed in the combinational 3- and 5-unit permutation code used in the telephone exchange to record information pertaining to connections established therein. It is the purpose of this invention to provide apparatus capable of translating information represented by 6-unit permutation code perforations in teletypewriter tape into the same information represented by 3- and 5-unit permutation code perforations in tape, wherein one line of perforations in the latter tape represents six characters as recorded in the teletypewriter tape.

It is desirable to convert handwritten information into information represented by perforations in teletypewriter tape and then convert this information into representations of characters expressed in a combinational 3 and 5-unit permutation code so that predetermined representations of characters may be interposed upon the final tape which contains the translated information and so that the final record is a tape that may be processed by automatic billing machines. The predetermined representations of characters that are interposed may indicate information required by the accounting office or they may indicate information which will serve to facilitate the automatic processing of the tape in automatic billing machines.

Apparatus for use in a telephone exchange utilizing a 3 and 5-unit combinational code and adapted to automatically record the information required to compute a subscriber's bill for local and toll calls is described in copending patent application Serial No. 759,402, filed by W. W. Carpenter and R. E. Collis on July 7, 1947. As disclosed in said copending application the automatically produced record of the information required to compute a subscriber's bill for local and toll calls comprises a paper tape which is perforated with a series of holes in six groups, each group of holes corresponding to a digit. The series of digits thus recorded, represents, in accordance with a simple code, the required details of the calls, and, by means of suitable sensing devices, may be transferred from the record tapes to automatic billing machines for production of subscriber's bills. In the discussion which follows, all tapes perforated in the manner described for the record tape will be referred to as AMA tapes (i. e. automatic message accounting tapes).

As shown on Figs. 21D and 21E, each series of perforations across the AMA tape is made up of six groups of perforations and consists of either 11 or 13 perforations. These perforations are actually staggered across the tape, but, for the purpose of this description, we shall assume that the perforations are placed in a straight row across the tape.

A certain series of perforations across the tape is designated "skip-splice" pattern (Fig. 21D), and another series is designated "splice" pattern (Fig. 21E). These patterns may be any arbitrary series of perforations to which the other automatic billing machines are responsive. Perforations representing the digits 2—8—6—0—X—Y, where the letters X—Y represent the 2-digit number assigned to the office in which the tape is being processed, are designated as skip-splice pattern. The splice pattern comprises perforations representing the digits 0—8—1—0—1—0. The skip-splice pattern comprises one line of perforations across the AMA tape and serves to identify the processing office and to indicate to the billing machines that the line of skip-splice pattern and the lines of splice pattern that follow are to be disregarded. The splice pattern usually follows the skip-splice pattern and comprises about twenty lines of perforations. Both these patterns are usually perforated at the beginning and at the end of each AMA tape, and are always disregarded by the other billing machines. They serve to assist in feeding the tape through the perforating machine by the meshing of the perforations with holes in the drum. The AMA tapes are cut and connected to one another by splices in the parts of the tape in which splice pattern has been perforated.

The permutation code information recorded in the teletypewriter tape which must be translated to the 3 and 5-unit permutation code represents the digits 0 to 9, inclusive, and "blank" and "erase" combinations.

The code used to represent these digits on the teletypewriter tape is illustrated in Fig. 21C and is as follows:

| Character | Holes Perforated |
| --- | --- |
| 0 | 4th and 5th. |
| 1 | 1st and 2nd. |
| 2 | 1st and 3rd. |
| 3 | 2nd and 3rd. |
| 4 | 1st and 4th. |
| 5 | 2nd and 4th. |
| 6 | 3rd and 4th. |
| 7 | 1st and 5th. |
| 8 | 2nd and 5th. |
| 9 | 3rd and 5th. |
| Blank | None. |
| Erase | 1st, 2nd, 3rd, 4th, 5th and 6th. |

The "blank" and "erase" combinations are discarded by the translator, so that only the digits 0 to 9 are represented on the AMA tape.

In the AMA tape, the first significant group of perforations, which is at the extreme left side of the tape, is termed the "A" or "entry" digit and serves to indicate the type of information recorded on the remainder of the line at the head of which it appears. Since only the digits 0, 1, 2 and 3 are required to identify the type of information recorded, a 3-unit code is sufficient to represent these digits. The code perforations in AMA tape corresponding to these four digital values of the A digit are as follows and are further illustrated in Fig. 21B:

| Digit | Holes Perforated in the First Group |
| --- | --- |
| 0 | 1st. |
| 1 | 2nd. |
| 2 | 3rd. |
| 3 | 1st, 2nd, and 3rd. |

Thus, the first digit A is represented by either one or all of three perforations.

The other five groups of perforations in the AMA tape, each group being reserved for one digit from B to F, inclusive, serve to indicate the details as to the call, and the apparatus must be capable of registering the digits 0 to 9, inclusive. A 5-unit code used to represent these digits follows and is further illustrated in Fig. 21A:

| Digit | Holes Perforated in any of the last five groups |
| --- | --- |
| 0 | 4th and 5th. |
| 1 | 1st and 2nd. |
| 2 | 1st and 3rd. |
| 3 | 2nd and 3rd. |
| 4 | 1st and 4th. |
| 5 | 2nd and 4th. |
| 6 | 3rd and 4th. |
| 7 | 1st and 5th. |
| 8 | 2nd and 5th. |
| 9 | 3rd and 5th. |

Thus, the last five digits on the AMA tape are represented by five groups of perforations and each digit is represented by two holes out of a possible five.

The above-mentioned copending application of W. W. Carpenter and J. W. Gooderham on January 29, 1947, further describes one unit of the automatic billing machines used to process AMA tape. Reference may be made to said last-mentioned copending application and to the previously-mentioned Carpenter et al. copending application for a complete description of the AMA tape records which are produced to indicate the information required to compute a subscriber's bill for local and toll calls. It should be noted that the system of coding described by these two patent applications differs from the system described by the applicants' disclosure. However, each system of coding is basically the same since each utilizes a 3-unit permutation code for the first group of perforations, wherein one or three perforations are made for each digit, and each utilizes a 5-unit permutation code for each of the other five groups of perforations, wherein two out of a possible five holes are perforated for each digit. Thus, it is apparent that the code combinations used are arbitrary, and that the applicants' apparatus or the apparatus disclosed in the above-mentioned copending applications might be modified to utilize a different code without departing from the invention described by each respective disclosure.

The essential elements of the translater of our disclosure comprise a tape transmitter, a control circuit, an electronic selector adapted to respond in a particular manner to each condition presented by the tape transmitter, a distributor circuit which serves to connect the selector to groups of storage relays, six groups of storage relays, and perforator apparatus made up of control relays, electromagnets, and perforator pins. In the description which follows, each of the elements of the translator will be described in the order indicated above. It will be noted that this order of considering the elements of the translator corresponds to the progress of the translating operation from the input to the output of the translator.

Fig. 2 indicates the tape transmitter and various cams, levers, and contacts associated with the main shaft of the apparatus. This tape transmitter serves to translate code combinations perforated in a tape into electrical impulses and is disclosed in Patent 2,055,567, granted to E. F. Watson on September 29, 1936. Reference may be made to that disclosure for a more complete description of the apparatus.

In Patent 2,055,567 as in the disclosure herein, a tape perforated in accordance with a 6-unit code is indicated as being fed over six sensing pins to actuate a system of levers which in turn controls six tongues. The tongues are connected to source of potential 2120 through a voltage divider made up of resistances 2A and 2BC, and each tongue connects with either its mark (upper) contact or its space (lower) contact depending upon whether or not its associated sensing pin lever is actuated. The tongue conditions presented by the tape transmitter for the various code characters are as follows:

| Character | Tongue Condition for Tongue— | | | | | |
|---|---|---|---|---|---|---|
| | 1 | 2 | 3 | 4 | 5 | 6 |
| 0 | S | S | S | M | M | S |
| 1 | M | M | S | S | S | S |
| 2 | M | S | M | S | S | S |
| 3 | S | M | M | S | S | S |
| 4 | M | S | S | M | S | S |
| 5 | S | M | S | M | S | S |
| 6 | S | S | M | M | S | S |
| 7 | M | S | S | S | M | S |
| 8 | S | M | S | S | M | S |
| 9 | S | S | M | S | M | S |
| Blank | S | S | S | S | S | S |
| Erase | M | M | M | M | M | M | where the symbol S represents the tongue connecting with its space contact and the symbol M represents the tongue connecting with its mark contact.

The levers to which the sensing pins are attached are operated by bail 2OB, under the influence of operating lever 2OL which is controlled in turn by cam 2OC mounted on main shaft 2MS.

The tape-out contacts 2TOC are actuated by shaft 2S which is supported by the tape as the tape is being fed across the sensing pins. When tape is being fed through the apparatus, contacts 2TOC are closed since the tension on the tape supports shaft 2S. When there is no tape being fed through the apparatus, contacts 2TOC are open since the lower contact framework must support one end of shaft 2S.

The tape is advanced over the sensing pins by means of the feedwheel which engages a continuous row of holes lengthwise of the tape. The feedwheel is rotated through a ratchet-wheel by a feed pawl mounted on one arm of a feed lever, shown to the left of the six contact levers. The feed levers are operated by the bail, under the influence of operating lever 2OL which is controlled in turn by cam 2OC mounted on the main shaft of the apparatus.

Main shaft 2MS is driven by a motor coupled through a clutch to a worm which drives a gear. The rotation of the shaft is controlled by means of stop arm 2SA which is operated under the influence of electromagnet 2SM to engage with or disengage from a peripheral shoulder on stop cam 2SC. Universal contacts 2UC and auxiliary contacts 2AC are actuated by insulated shafts which are under the influence of cams 2UCC and 2ACC which are in turn attached to shaft 2MS.

The main function of the control circuit indicated in Fig. 4 is to assist in controlling and synchronizing the operation of the various elements of the translator. Its characteristics will be more clearly understood from the consideration of the operation of the translator which is described in a subsequent section of this disclosure.

Figure 6:
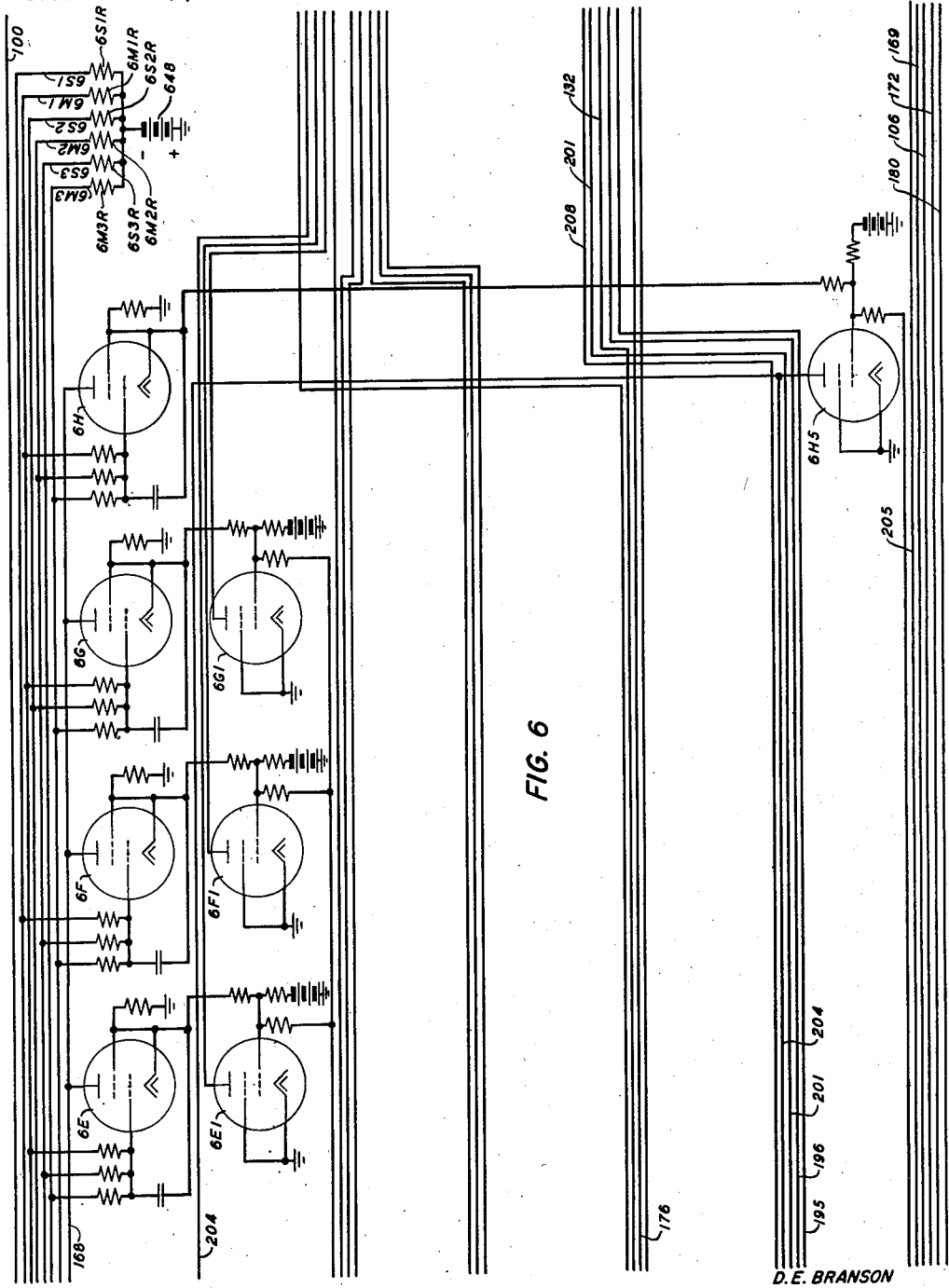

The selector circuit is indicated in Figs. 5 and 6. It comprises two groups of thyratron discriminator tubes, 5A to 6H and 51 to 55, and one group of thyratron selector tubes, 5A1 to 6H5.

The mark and space contacts associated with tongues 2T1, 2T2 and 2T3 are connected to the selector circuit through six bus bars 5S1, 5M1, 5S2, 5M2, 5S3 and 5M3, and the mark and space contacts associated with tongues 2T4, 2T5 and 2T6 are connected to the selector circuit through the other six bus bars, 6S4, 6M4, 6S5, 6M5, 6S6 and 6M6. In order to simplify this consideration of the selector circuit, only the relationship between tongues 2T1, 2T2 and 2T3 and tubes 5A to 6H will be considered in detail. It will be apparent that similar relationships exist between tongues 2T4, 2T5 and 2T6 and tubes 51 to 55.

Tongues 2T1, 2T2 and 2T3 and tubes 5A to 6H are interconnected by means of the six bus bars 5S1, 5M1, 5S2, 5M2, 5S3 and 5M3. These bus bars are connected to the negative terminal of battery 648 through resistors 6S1R, 6M1R, 6S2R, 6M2R, 6S3R and 6M3R which are of equal and relatively high resistance compared with the resistance of the voltage divider made up of resistances 2A and 2BC. The positive terminal of battery 648 is grounded. Assuming that the potential of battery 648 is −48 volts and that the potential between the junction between resistors 2A and 2BC and ground is +10 volts, it is apparent that each bus bar is at a potential of −48 volts with respect to ground unless the marking or spacing contact connected to that bus bar is in contact with its associated tongue. If the contact connected to that bus bar is connected with its associated tongue, the bus bar is at a potential of approximately +10 volts since the resistance of the terminating resistor of the bus bar is relatively high compared with the resistance of the voltage divider which is connected to the tongues.

The control grid of each of the discriminator tubes 5A to 6H is connected through three equal resistances to three of the six bus bars corresponding to the mark or space contacts associated with tongues 1, 2 and 3 of the tape transmitter. These resistances which connect the control grid of each discriminator tube to the bus bars are of relatively large resistance compared with the bus bar terminating resistances 6S1R to 6M3R, and the three resistances of each tube are connected to the six bus bars in such manner that each tube is connected to a combination of three bus bars which differs from the combination to which any of the other tubes is connected. When the discriminator tubes are connected in this manner and the circuit components are properly proportioned, the control grid potential in only one of the thyratron tubes in the series 5A to 6H is of positive potential with respect to its cathode for each combination of connections between the three tongues and the six bus bars with which they are associated. Thus, only one of the eight thyratron discriminator tubes is permitted to become conducting for each condition presented by the tape transmitter 2TS.

For a more detailed understanding of the selective action performed by the discriminator tubes, reference may be made to Figs. 19 and 20 which show the eight possible conditions which may be presented to the control grid of discriminator tube 5A. These conditions may be presented to any of the other tubes 5B to 6H, but the condition represented by a particular combination of connections between the tongues and the mark or space contacts differs for each of the eight tubes.

Fig. 19(A) shows the various elements of the translator which must be considered in order to understand the discriminator tube action. It will be noted that the identifying symbols are the same as those used in Figs. 2, 5 and 6 and that the magnitude and polarity of the potentials with respect to ground at various points are indicated by appropriate symbols and numerals enclosed in parentheses. These quantities are given for the purpose of illustration only, and are not intended to limit the disclosure to the specific values indicated.

In Fig. 19(A) the circuit illustrated corresponds to the condition created when the three tongues 2T1, 2T2 and 2T3 are connected to space contacts. For this condition there is no connection between the voltage divider made up of resistances 2A and 2BC and bus bars 6S1, 6S2 and 6S3; therefore, the entire potential of battery 64B is applied between the control grid of tube 5A and ground. For the battery indicated this potential is 48 volts, and since the negative battery terminal is connected to the control grid, thyratron tube 5A is not permitted to pass an interelectrode current.

Illustrated in Figs. 19(B), 19(C) and 19(D) is the condition created when two of the tongues are connected to space contacts and one tongue is connected to a mark contact. For this condition there is a connection between the voltage divider and one of the bus bars, and, as a result of the resistance network so created, the control grid of the tube is at a potential of about −30 volts with respect to ground which similarly will not permit the passage of interelectrode current through the involved tube.

Illustrated in Figs. 20(A), 20(B) and 20(C) is the condition created when two of the tongues are connected to mark contacts and one tongue is connected to a space contact. For this condition there is a connection between the voltage divider and two of the bus bars, and, as a result of the resistance network so created, the control grid of the tube is at a potential of about −12 volts with respect to ground similarly not permitting the passage of interelectrode current through the involved tube.

Illustrated in Fig. 20(D) is the condition created when all three tongues are connected to mark contacts. For this condition there is a connection between the voltage divider and all three bus bars, and, as a result of the resistance network so created, the control grid of the tube is at a potential of about +9 volts with respect to ground. Since the grid electrode is thereby made positive with respect to the cathode of the involved utbe, the latter is caused to coduct.

Thus, it is apparent that the control grid of each of the thyratron discriminator tubes illustrated in Figs. 19 and 20 is at positive potential with respect to ground for only one of the eight conditions which may be presented by the three tape transmitter tongues. The cathode of each discriminator tube is connected to ground through a resistance so that the control grid is at a positive potential with respect to its cathode when the control grid is at a positive potential with repect to ground. Therefore, the thyratron tube under consideration will be permitted to become conducting only when one of the eight possible sensing device tongue conditions is presented to the six interconnecting bus bars.

As pointed out hereinbefore, the description applied to tube 5A is applicable to any of the other seven tubes except that each tube is connected to the mark and space contacts through different bus bars, and, therefore, for each tube a different combination of connections between the sensing device tongues and the mark and space contacts is required to create the conditions illustrated in Figs. 19 and 20.

Also as pointed out hereinbefore, the description applied to discriminator tubes 5A to 6H is applicable to discriminator tubes 51 to 55 except that only five tubes are utilized and therefore only five of the eight possible combinations of connections between tongues 2T4, 2T5 and 2T6 and bus bars 6S4, 6M4, 6D5, 6M5, 6S6 and 6M6 are utilized.

The cathode of each of the selector tubes 5A1 to 6H5 is grounded, and the control grid of each tube is connected so that the grid voltage may be obtained from three sources. Each control grid is connected through resistances to the cathode of one discriminator tube in each group and to the negative terminal of a battery whose positive terminal is grounded. The circuit components are proportioned so that each selector tube is biased to cut-off except for the condition which arises when the control grid of one of the selector tubes is connected to two discriminator tubes that are conducting current. In the latter case, the selector thyratron whose control grid is not biased to cut-off is permitted to conduct current and thereby operate a relay in its plate circuit. Since only one discriminator tube in each group is allowed to become conducting for each condition presented by the sensing device, and since each selector tube is connected to a different combination of two of the discriminator tubes, it is apparent that only one selector tube is permitted to become conducting for each tongue condition presented by the tape transmitter.

For a further consideration of the selector circuit we shall describe the action of the selector circuit in response to the condition presented by the tape transmitter when the tongues are connected as follows: 2T1-space, 2T2-space, 2T3-space, 2T4-mark, 2T5-mark and 2T6-space. Initially all the selector and discriminator tubes are in a non-conducting condition and each tube is biased to cut-off. The tape transmitter condition described above causes the control grids of tubes 5A and 54 to become positive with respect to their cathodes, but the control grids of all the other discriminator tubes remain biased to cut-off. As soon as the bias is removed from tubes 5A and 54, these tubes begin conducting current and the voltage across cathode resistors 5RX3 and 5RY4 is changed from zero to a value determined by the size of the resistors and the current flowing through the tube. This voltage causes each cathode of tubes 5A and 54 to assume a positive potential with respect to ground, and these two positive potentials are applied to the control grid of tube 5A4 through resistors 5X40 and 5Y40. A negative potential is applied to the control grid of tube 5A4 from battery 548 through resistor 5Z40. The value of resistances 5RX3, 5RY4, 5X40, 5Y40 and 5Z40 are proportioned so that a positive potential is applied to the control grid of tube 5A4 only if current is being conducted through both discriminator tubes 5A and 54. Thus, tube 5A4 is permitted to become conducting in response to the tape transmitter condition under consideration, and all the other selector tubes remain biased to cut-off.

The thirteen discriminator tubes indicated in Figs. 5 and 6 are capable of controlling forty selector tubes, but only twelve selector tubes are employed in this disclosure since the apparatus is designed to translate only twelve representations of characters. It is evident that the use of two groups of discriminator tubes made up of eight tubes in each group and the use of sixty-four selector tubes under the control of the sixteen discriminator tubes would permit the selector circuit to respond in a particular manner to each of the sixty-four conditions which the six-tongue tape transmitter is capable of producing. The use of sixty-four selector tubes as described and enlarged distributor, storage relay, and perforator control relay circuits, would permit the apparatus to translate any one of sixty-four code representations of characters to a different code representation of the character. It follows that by increasing the number of sensing pins in the tape transmitter, increasing the number of tubes in the selector circuit, and expanding the distributor, storage relay, and perforator apparatus, a translator could be produced which would respond in a particular manner to one out of a very large number of conditions.

The distributor circuit shown in Figs. 7 and 8 serves to connect the selector circuit successively to each group of the storage relays during each cycle of operation of the translator. This method of distribution is required in order to permit the tape transmitter and the perforating apparatus to operate simultaneously and thereby make the translation from one system of coding to another more rapidly.

The distributor comprises six multiple-armature relays, the contacts of each relay being connected to the windings of the relays in the corresponding storage relay groups and the armatures of each relay being connected to the selector tubes corresponding to the digits to be registered in the storage relay circuit. These multiple-armature relays are under the control of an electronic counting circuit which is in turn under the control of auxiliary contacts 2AC.

The counting circuit comprises six thyratron tubes and six control relays. The tubes are interconnected so that the potential of the cathode of each tube with respect to ground, is applied to the resistance network which determines the bias on the control grid of the next succeeding tube. The control grid of each tube is connected through resistances to biasing battery 748 and through condensers to conductor 206 which is, in turn, connected to the rotor of contacts 2UC while the translator is in operation. In addition, the control grid of tube 7HC1T is connected through resistances to the positive terminal of battery 7120. Initially, each tube is biased to cut-off but the bias applied to tube 7HC1T is less than that applied to the other tubes due to the potentiometer established by resistances 7E1 and 7F1. The rotor of contacts 2UC is initially at ground potential thereby grounding one side of condensers 7HC1C to 7HC6C through conductor 206 and resistor 7JR. As soon as the rotor moves to the left contact, an electrical pulse is applied to condensers 7HC1C to 7HC6C through the circuit comprising battery 2120, resistor 2DR, left contacts of 2UC, conductor 205, resistor 7JR, conductor 206, and resistor 7KR. This electrical pulse is applied through the condensers to the control grid of each tube, and is of a polarity which tends to reduce or remove the biasing voltage applied to the tubes. The magnitude of the first voltage pulse is sufficient to overcome the bias applied to the control grid of tube 7HC1T only, the other tubes remaining biased to cut-off. Thus, thyratron tube 7HC1T is permitted to become conducting and the current flowing through the tube serves to operate relay 7HC1. The operation of this relay serves to release distributor relay 7DCA and to operate relay 7DCB. The current flowing through tube 7HC1T passes through cathode resistor 7H1 and the voltage drop thereby effected serves to raise the cathode to a positive potential with respect to ground. The bias applied to tube 7HC2T from battery 748 is determined by the voltage divider established by resistors 7E2, 7D2 and 7H1. Since the voltage across resistor 7H1 is effected by the current flowing through tube 7HC1T, it is apparent that the bias applied to the control grid of tube 7HC2T is reduced. Since the bias on tubes 7HC3T to 7HC6T remains unchanged, the next electrical pulse applied to the control grids by the operation of contacts 2UC serves to remove the bias from tube 7HC2T and permit only this tube to become conducting. Thus, as each of the counting tubes becomes conducting, it enables the next succeeding tube so that it will become conducting upon the next operation of contacts 2UC. The rotor of contacts 2UC returns to ground between each pulse so as to dissipate the charges in the condensers so that the potential applied to the control grids through the condensers will be equal for each pulse. The counting tubes remain in a conducting condition until relay 7HC6 is operated at which time all the tubes are restored due to the operation of relays 14PCK and 7HCR. The counting circuit is then restored to its initial condition and the cycle of operation may be repeated.

Key 8SPK and relays 8SP and 8SKS serve to present special conditions to the distributor output circuit. The functions of these elements will be fully discussed in a subsequent section of this disclosure where the operation of the translator is described.

Figs. 9, 10, 11 and 12 show the six storage relay circuits 9AS, 9BS, 9CS, 9DS, 10ES and 10FS. The relays in groups 9CS, 9DS, 10ES are shown in block diagrammatic form since these groups are identical with group 9BS. The indication of these three relay groups in block diagrammatic form for the storage relay circuit is continued for the corresponding relay groups in the perforator control circuit, the perforator control checking circuit, and for the corresponding groups of electromagnets in the tape perforating apparatus.

Each group of storage relays contains a control relay and ten relays representing the digits 0 to 9, except the 9AS group which contains only four relays representing the digits 0 to 3. The contacts of the relays corresponding to the various digits in each group are interconnected in a chain checking circuit so that the control relays are allowed to operate only if one digit relay in each group is operated. When all the control relays 9ASC to 10FSC are operated, a path is closed which permits the perforator control relays whose circuits are completed through the digit relays to operate.

The perforator control relays are shown in Figs. 13 and 14. Each relay has a primary (lower) and a secondary (upper) operating winding so that the relay may be initially operated through its secondary winding and then be locked in its operated condition through its primary winding. This locked condition is maintained through relay 16TM1 until the perforating apparatus has completed its operation.

The perforator control checking circuit is shown in Figs. 15 and 16. This checking circuit serves to prevent further operation of the translator unless one or all the relays of the 15AC group and two relays in each of the other 15BC to 16FC groups are operated.

Figs. 17 and 18 show the perforating and stepping apparatus which serves to record the translated information. This apparatus is disclosed in more detail by copending patent application Serial No. 588,401, filed April 14, 1945, by W. W. Carpenter.

Each of the perforator electromagnets 17A0 to 18F7 serves to operate an armature to which an arm and a perforator pin is attached. In order to simplify the drawings, the armature, arm and perforator pin for electromagnet 17A2 are the only ones shown.

The punching ends of the perforating pins are structurally devised so as to present a substantially cone-shaped end to the tape, and the drum which carries the tape is provided with a multiplicity of apertures having inverted cone-shaped mouths arranged in transverse rows so as to be in alignment with the punch pins. Thus, when a perforating pin is actuated, its cutting end intrudes that portion of the tape which is interposed between the pin and a corresponding aperture in the drum, into the aperture so as to effect a tape protrusion, or embossment, which assumes a configuration determined by the cone-shaped contours of the punch pin and its corresponding drum aperture. During the intruding of the tape portion into the drum aperture the tape is subjected to a stretching process which permits the cutting end of the punch pin to pierce the tape and thereby effect a chadless perforation. When the pin is withdrawn, the tape embossment or protrusion remains embedded in the drum aperture to effect a coupling, or driving connection between the tape and the drum. When the drum is rotated, the tape is carried along therewith since the movement of the drum is imparted to the tape through the cooperation of the drum aperture and its embedded tape embossment.

The translated information appears as six groups of perforations in the tape. The perforations corresponding to the 17AP group of electromagnets correspond to the 3-unit code previously described, and the perforations corresponding to each of the other groups correspond to the 5-unit code previously described.

The three holes of the first digit which appears on the final tape are designated as the group comprising the "A" digit for the purpose of this disclosure, and these holes are designated by numbers 0, 1 and 2. The perforation of any hole registers the code representation for the digit assigned to that hole, and the perforation of all three holes registers the code representation for the digit 3 (the sum of the three digits). The other five groups of holes are designated from left to right across the AMA type as the B to F digits, and the holes in each group are designated by numbers 0, 1, 2, 4 and 7. Two holes are always perforated for each digit, and the sum of the two numbers assigned to the holes perforated is the digit registered, with the exception that the code representation for the digit 0 is registered by holes 4 and 7. It should be noted that the designation of each item in the circuits indicated in Figs. 9 to 18 which is directly associated with the perforation of one of the six groups of holes A to F bears a letter corresponding to the group within which it falls, a number corresponding to the 0, 1 and 2 or to the 0, 1, 2, 4 and 7 system of coding, a letter in most cases indicating the function of the item, and a numeral indicating the figure within which the item falls.

The alarm circuit shown in Fig. 3 serves to give a visual alarm if either tape runs out or if electromagnet 2SM is not energized for about eight seconds.

OPERATION

The following detailed description of the translator operation is given in the approximate sequence in which the translation from 6-unit permutation code in teletypewriter tape to 3- and 5-unit permutation code in AMA tape takes place.

When the tape transmitter and the tape perforating apparatus contain no tape and when the filaments of all tubes are heated and the batteries are connected as shown in the drawings, a circuit is completed from ground through battery 348, the winding of relay 3AMA, conductor 100 and the closed contacts of switch 17TOC to ground thereby operating relay 3AMA. Relay 3TOT remains unoperated, and, as a result, a circuit is completed from battery 348 through resistor 3R, armature 3 of unoperated relay 3TOT, and conductor 101 to condenser 3C5 which connects the negative terminal of the battery to the cathode element 3 of tube 3T5. The positive terminal of battery 3I20 is connected to element 3 of tube 3T5 through conductor I0I; however, this connection is made through one element of the voltage divider comprising resistors 3C5R and 3B5R, and the circuit components are proportioned so that cathode 3 of tube 3T5 is at a negative potential with respect to ground. Since control grid I of the tube is connected to ground through resistor 3A5R, this grid is at a positive potential with respect to cathode 3 and sufficient current is permitted to flow through the tube to operate relay 3TM5 which is placed in the plate circuit of the tube. The operation of relay 3TM5 closes its contacts, and, as a result, relay 3TTOA is energized through the circuit from ground through the closed contacts of relay 3TM5, conductor I03, unoperated armature 4 and the outer contact of relay 3TOT, conductor I05, the winding of relay 3TTOA, and battery 348 to ground. When relay 3TTOA operates, its armature completes an obvious circuit which lights the "TTY tape out" lamp to indicate the absence of tape in the transmitter. Relay 3ATOA is also energized since a circuit is completed from ground through battery 348, the winding of relay 3ATOA, conductor I04, armature I of operated relay 3AMA, conductor I03, and the closed contacts of relay 3TM5 to ground. When relay 3ATOA is operated, its armature completes an obvious circuit which lights the "AMA tape out" lamp to indicate the absence of tape in the AMA perforator.

*Inserting AMA tape in perforator*

The AMA tape is passed below tape-out contact lever I7TOL and over drum I7D between the perforating pins and the drum. This opens tape-out contact I7TOC and thereby releases relay 3ATOA which in turn releases relay 9ATOA and extinguishes the "AMA tape out" lamp.

The AMA tape is fed forward by the meshing of splice pattern perforations with the holes in the drum until the tape is properly meshed and feeding smoothly. Splice pattern is perforated as follows: Key 8SPK is operated and held, operating relay 8SP by grounding conductor I06 through contacts I of key 8SPK. The operation of relay 8SP serves to ground conductors I07, I08, I09, II0, III, and II2 through the relay contacts, and relays 9AS0, IIBS8, 9CSI, 9DS0, I0ESI, and I0FS0 are operated while these conductors are grounded. These relays in turn operate relays 9ASC, 9BSC, 9CSC, 9DSC, I0ESC, and I0FSC respectively. The circuits which serve to energize the 9ASC to I0ESC relays are similar and the description of the circuit for relay 9BSC which follows is applicable to any of the other control relays except relay I0FSC. When relay 8SP operates, an electrical circuit is completed from ground through armature 2 of relay 8SP, conductor I08, the winding of relay IIBS8, conductor II3, and battery 9I20 to ground, and this circuit serves to operate relay IIBS8. When relay IIBS8 is operated its armature 5 completes an electrical circuit which serves to energize relay 9BSC as follows: from ground through battery 948, the winding of relay 9BSC, conductor I23, unoperated armature 4 of relay 9BS0, conductor I24, unoperated armature 5 of relay 9BSI, conductor I2I, unoperated armature 5 of relay 9BS2, conductor I20, unoperated armature 5 of relay 9BS3, conductor II9, unoperated armature 5 of relay IIBS4, conductor II8, unoperated armature 5 of relay IIBS5, conductor II7, unoperated armature 5 of relay IIBS6, conductor II6, unoperated armature 5 of relay IIBS7, conductor II5, operated armature 5 of relay IIBS8, conductor II4 and unoperated armature 4 of relay IIBS9 to grounded conductor I24. It will be observed that the electrical circuit for operating relay 9BSC is carried through the group of relays 9BS0 to I4BS9 in such a way that it is permitted to operate only if a single relay in the group is operated. Thus, if the apparatus is defective and more than one of the 9BS0 to IIBS9 relays are operated, the control relay 9BSC will not operate and the translator will cease to function. It will be noted that the 9AS group of relays contains only five relays as compared with the other groups 9BS to I0ES; however, the method of operation is identical with the exception that we must consider only the five relays shown in the drawing. Relay group I0FS differs from group 9BS in that relay I0FSC is permitted to operate only if relay I4PCK is released.

The operation of all the relays 9ASC to I0FSC operates relay I0J since an electrical path is established from ground through the armature of relay 9ASC, conductor I25, the armature of relay 9BSC, conductor I26, the armature of relay 9CSC, conductor I27, the armature of relay 9DSC, conductor I28, the armature of relay I0ESC, conductor I29, the armature of relay I0FSC, conductor I30, the winding of relay I0J, and battery I048 to ground. When relay I0J is operated, key 8SPK is permitted to operate relay I0K through the circuit from ground through contacts 2 of key 8SPK, conductor I32, the No. 3 armature of relay I0J, conductor I3I, the winding of relay I0K, and battery I048 to ground. When relay I0K operates it locks in parallel to all the operated relays in the 9AS to I0FS groups. Considering the lock between relay I0K and the 9BS relay group in which the relay IIBS8 is operated, it will be observed that a locking circuit is completed from ground through battery I048, the winding of relay I0K and No. 2 contacts I33, operated armature 2 of relay I0K, conductor I33, operated armature 6 of relay IIBS8, and conductor I34 to ground. Relay I0K in turn operates relay I0TS through the electrical path established from ground through battery I048, the winding of relay I0TS, conductor I36, operated armature 2 of relay I0J, conductor I35, operated armature I of relay I0K to ground.

As soon as relay I0TS operates, relays I3A0, I3BI, I3B7, I3C0, I3CI, I3D2, I3D7, I4E0, I4EI, I4F4, and I4F7 operate as a result of a circuit completed through their secondary (upper) windings and the operated relays in the 9AS to I0FS groups. These operated I3A0 to I4F7 relays lock to relay I6TMI through their primary windings. Considering only the I3B group of relays, the circuit for energizing relay I3BI is completed from ground through battery I348, conductor I37, the upper winding of relay I3BI, conductor I38, armature I of operated relay IIBS8, conductor I40, armature 2 of operated relay I0TS, conductor I4I, and armature 5 of unoperated relay I4PCK to ground. The circuit for energizing relay I3B7 is completed from ground through battery I348, conductor I37, the upper winding of relay I3B7, conductor I39, and armature 3 of relay IIBS8 to conductor I40, and from conductor I40 to ground as described for the operation of relay I3BI. Relays I3BI and I3B7 lock to unoperated relay I6TMI from ground through their lower windings and resistors I3BIR and I3B7R, respectively, to conductor I42, and from conductor I42 through the outer contact and unoperated armature of relay 16TM1 and battery 16A8 to ground.

Each of the operated relays in the 13A to 14F groups operates the electromagnet with which it is associated in groups 17AP to 18FP of the perforator and also the corresponding check relay in groups 15AC to 16FC. Considering only the 13B group, two relays, 13B1 and 13B7, are in an operated condition as described hereinbefore. The operation of relay 13B1 serves to close an electrical circuit which energizes check relay 15B1C and perforator electromagnet 17B1 through the path from ground through the operated armature and inner contact of relay 13B1, conductor 145, the winding of relay 15B1C, conductor 148, the winding of electromagnet 17B1, conductor 149, and battery 174B to ground. The operation of 13B7 serves to energize relay 15B7C and electromagnet 17B7 in a similar manner through conductors 146, 147 and 149. The operation of any check relay serves to connect conductor 143 to grounded conductor 223 and thereby complete an electrical circuit for energizing relay 14PA from ground through conductor 223, the upper armature and contact of the operated check relay, conductor 143, the winding of relay 14PA, conductor 144, the unoperated armature and upper contact of relay 16TM2, and battery 16A8 to ground. The operation of relay 14PA completes an electrical path from ground through the operated armature of relay 14PA, conductor 150, the winding of relay 14PAC, conductor 151, the winding of electromagnet 17PAM, and battery 174B to ground which energizes relay 14PAC and electromagnet 17PAM.

Groups of relays 15AC to 17FC comprise a well-known chain checking circuit. The electrical circuits formed through the checking circuit are checked to verify if one or all the relays in the 15AC group are operated and if two out of five relays of the 15BC to 16FC groups are operated. An electrical path is created when the checking circuit verifies that the requisite number of checking relays is operated, and this electrical path serves to connect grounded conductor 152 to the upper winding of relay 14PCK through the chain checking circuit, conductor 153, the upper armature of operated relay 14PAC, and conductor 154. Thus, the winding of relay 14PCK is energized by battery 14A8. Relay 14PCK locks to all the operated check relays, the lower armature of operated relay 14PAC, and the armature of unoperated relay 16TM3 through armatures 1 and 2 of relay 14PCK and conductors 143 and 155.

The energization of the perforator electromagnets causes the perforating pins associated therewtih to perforate the AMA tape in accordance with the various code representations. The code representation perforated by the 17BP group of electromagnets for the circuit condition described hereinbefore is the perforation of the second and fifth holes in the B group of holes in the AMA tape, and these two perforations are the code representation for digit 8. Thus, it is apparent that when key 8SPK is operated for an instant the perforator pins will be caused to perforate the permutation code representations for digits 0—8—1—0—1—0 across the tape for the A to F groups of holes. This 0—8—1—0—1—0 pattern is designated splice pattern as discussed hereinbefore.

Since it is desired to perforate several lines of splice pattern on the first part of the AMA tape, key 8SPK is held operated for the necessary interval of time. While key 8SPK is operated and an electrical path is completed through the checking relays, relay 14PCK is operated, and since armature and contact 5 of relay 14PCK are not connected, the ground for the secondary (upper) windings of the operated relays in groups 13A to 14F is removed, and ground is removed from relay 10FSC which releases. The operation of armature 4 of relay 14PCK applies the potential of battery 14A8 to condenser 16C1 through resistor 14T and conductor 156. The release of relay 10FSC breaks the connection between conductors 129 and 130 thereby releasing relay 10J, which in turn breaks the connection between conductors 135 and 136 and releases relay 10TS. The operation of relay 14PCK also disconnects armature 3 of relay 14PCK from conductor 159 and thereby removes locking ground from the operated relays in groups 9AS to 10FS, but they are still held operated by key 8SPK and relay 8SP. After about 0.03 second, relay 16TM1 operates, unlocking the primary (lower) windings of the operated relays in groups 13A to 14F, permitting them to release and in turn release the operated check relays and perforator electromagnets. This 0.03 second allows the perforator electromagnets to be energized long enough to cause the perforator pins to perforate the AMA tape and emboss the paper properly.

The delay in the operation of relay 16TM1 is accomplished as follows: normally condenser 16C1 is charged to a potential of about +100 volts, due to the voltage divider made up of resistors 16BIR and 16CIR connected across battery 1612B. The operation of relay 14PCK connects —48 volts from battery 14A8 through resistor 14T to the mid-point of the voltage divider, 16BIR and 16CIR, changing the potential at this point by 148 volts. Condenser 16C1 starts to change to this new potential through resistor 16AIR, and when the potential of grid 1 of tube 16T1 approaches that of cathode 3, sufficient current will flow between cathode 3 and plate 2 to operate relay 16TM1 which is in the plate circuit of the tube. The time of operation is therefore a function of the values of condenser 16C1 and resistor 16AIR. When relay 14PCK is released as will be described hereinafter, +100 volts is reconnected to the cathode side of condenser 16C1, and elements 1, 4 and 5 of tube 16T1 become positive with respect to cathode 6. Under this condition condenser 16C1 charges rapidly, since the effective resistance from plate 5 through the interelectrode space in the tube to cathode 6 and ground is low. Thus, the recovery time of the circuit is short.

When relay 16TM1 operates, battery 16A8 is connected through conductor 157 to condenser 16C2. This applies —48 volts to condenser 16C2 and after about 0.006 second, relay 16TM2 operates. This delay circuit in the same manner as described for the circuit for relay 16TM1 except that the time delay is reduced by using suitable values for condenser 16C2 and resistor 16A2R. When relay 16TM2 operates, the connection between battery 16A8 and conductor 144 is broken and relay 14PA releases, which in turn releases relay 14PAC and electromagnet 17PAM, allowing paper drum 17D to rotate one step and thereby feed the paper one line into the perforator due to the pull exerted upon feed pawl 17FP by spring 17S. The 0.006 second delay allows the perforator pins to be withdrawn from the paper before it is fed.

When relay 16TM2 operates, battery 16.48 is connected through conductor 158 to condenser 16C3. This applies voltage to condenser 16C3 and after about 0.02 second relay 16TM3 operates. This delay circuit operates in the same manner as described for the circuit for relay 16TM1 except that different values are used for condenser 16C3 and resistor 16A3R. When relay 16TM3 operates, ground is removed from conductor 155 thereby releasing relay 14PCK since all the relays in the 15AC to 16FC groups and relay 14PAC have released. The release of relay 14PCK serves to reoperate relays 10FSC, 10J, and 10TS, to disconnect battery 1448 from condenser 16C1 so that relay 16TM1 releases, in turn releasing relays 16TM2 and 16TM3, and to reapply ground to conductors 141 and 140 thereby reoperating relays in the 13A to 14F groups through the connections made by the operated relays in the 9AS to 10FS groups.

Splice pattern will continue to be perforated and the paper fed across the drum as long as key 8SPK is held. When key 8SPK is released, relay 8SP releases and the operated relays in the 9AS to 10FS groups release when relay 14PCK next operates and removes the ground applied to conductor 159 through armature 3 of relay 14PCK. When relay 14PCK releases after the perforation of the last line of information in the AMA tape, the circuit comes to rest.

*Inserting teletypewriter tape*

The teletypewriter tape to be translated is placed in tape transmitter 2TS, closing tape-out contacts 2TOC. This energizes relay 3TOT through the circuit established from ground through battery 348, the winding of relay 3TOT, conductor 160, and contacts 2TOC to ground. The operation of relay 3TOT breaks the connection between its armature 4 and conductor 105 thereby releasing relay 3TTSA and extinguishing the "TTY tape out" lamp. Also, when relay 3TOT operates, a circuit is closed from ground through armature 1 of relay 3TOT, conductor 161, unoperated armature 3 of relay 3AMA, conductor 162, the winding of relay 4TP, and battery 448 to ground which operates relay 4TP. The operation of relay 3TOT also breaks the connection between armature 3 of relay 3TOT and resistor 3R, thereby breaking the circuit between battery 348 and cathode 3 of tube 3T5 and removing the positive potential of grid 1 with respect to cathode 3 of tube 3T5, permitting the potential developed across resistor 3B5R to bias the tube to cut-off and release relay 3TM5 which is in the plate circuit of the tube.

*Perforating skip-splice and splice pattern at start of tape*

The "begin tape" key, Fig. 4, is operated momentarily, connecting conductors 102 and 163 thereby connecting operating ground to relays 4SOT and 4BTC through grounded contact and armature 3 of operated relay 4TP. Relay 4SOT locks to released relay 4ENT through the circuit from the winding of relay 4SOT through its armature 3, conductor 164, and unoperated armature 4 of relay 4ENT to ground. Relay 4BTC locks to relay 4TP through the circuit from the winding of relay 4BTC through operated armature 2 of relay 4BTC, conductor 163, and operated armature 3 of relay 4TP to ground. The operation of relay 4SOT energizes the winding of relay 4BT through the electrical path established from ground through operated armature 4 of relay 4SOT, conductor 166, unoperated armature 1 of relay 4ENT, conductor 165, the winding of relay 4BT, and battery 448 to ground. The operation of armature 1 of relay 4BTC connects the fixed contact of auxiliary contacts 2AC to relay 4ER through conductors 167 and 168 and resistor 4AR and also connects the fixed contact to the plates of discriminator tubes 51 to 55 and 5A to 5H. The latter connection is made from the fixed contact through conductor 167, contact and armature 1 of operated relay 4BTC, and conductor 168.

The blank portion at the beginning of the tape is normally placed in the transmitter and, as a result of the tape transmitter tongue condition thereby established, discriminator tubes 51 and 5A become conducting when relay 4BTC is operated in response to the operation of the "begin tape" key, Fig. 4. As described hereinbefore, when tubes 51 and 5A become conducting, they cause voltages to be applied to the control grids of the selector tubes which cause tube 5A1 to become conducting, the potential of battery 2120 being connected to the plate of the tube through contacts 2AC, conductor 167, operated armature 1 of relay 4BTC, conductor 168, resistor 4AR, the winding of relay 4ER, and conductor 204. Thus, relay 4ER operates and connects operating ground to relay 4ERA through conductor 211 and armature 2 of relay 4ER.

The operation of relay 4BT sets up on electrical path from ground through battery 848, the winding of relay 8SKS, conductor 169, operated armature 4 of relay 4BT, conductor 170, the outer contact and released armature 4 of relay 4PC1, conductor 171, the outer contact and released armature 3 of relay 4PC2, conductor 172, and released armature 5 of relay 10TS to ground which operates relay 8SKS. The operation of relay 8SKS operates relays 9AS2, 9BS8, 9CS6, 9DS0, and one relay in each of the 10ES and 10FS groups. The relays operated in the 10ES and 10FS groups depend upon the wiring of the contacts of relay 8SKS, which is in accordance with the 2-digit number assigned to the accounting office. The operation of one relay in each of the 9AS to 10FS groups operates one or all the relays in group 13A and two out of five of the relays in groups 13B to 14F, which in turn operate their associated check relays and perforator magnets, causing the perforation of code characters representing the digits 2—8—6—0—X—Y which is one line of skip-splice pattern. (The letters X and Y represent the 2-digit number assigned to the accounting office.) This action of the translator is similar to that described hereinbefore for the perforation of splice pattern with the exception that relay 10K obtains its operating ground from conductor 132 through operated armature 7 of relay 4BT instead of through contacts 2 of key 8SPK.

The operation of relay 10K operates relay 10TS as explained hereinbefore, and the operation of relay 10TS connects an operating ground to relay 4PC1 through armature 4 of relay 10TS, conductor 176, armature 2 of operated relay 4SOT, conductor 175, armature 1 of unoperated relay 4PC1A, and conductor 174. Operated relay 4PC1 locks to relay 4ENT through armature 3 of operated relay 4PC1, conductor 177, unoperated armature 4' of relay 4ENT, conductor 178, and unoperated armature 3 of relay 4FN. The operation of relay 10TS also releases relay 8SKS by breaking the connection between conductor 172 and armature 5 of relay 10TS. The operation of relay 14PCK, when the check relays have completed their response to the line of skip-splice pattern, releases relay 10FSC by opening the connection between armature 5 of relay 14PCK and conductor 141, and relay 10FSC in turn breaks the connection between conductors 129 and 130 thereby releasing relays 10J and 10TS. The release of relay 10TS operates relay 8SP through the electrical path established from ground through armature 5 of relay 10TS, conductor 172, unoperated armature 3 of relay 4PC2, conductor 171, operated armature 4 of relay 4PC1, conductor 179, operated armature 5 of relay 4BT, conductor 106, the winding of relay 8SP, and battery 848 to ground. The operation of relay 8SP causes the perforation of splice pattern, as described hereinbefore, at the rate of about 7 lines per second as long as relay 8SP remains operated.

The operation of relay 4PC1 also starts the timing circuit associated with tube 4T4 by connecting source of potential 448 to cathode 3 of the tube through operated armature 2 of relay 4PC1 and armature 3 of operated relay 4BT. This timing circuit operates in the same manner as that described for tube 16T1 except that the circuit constants are proportioned so that relay 4TM4 operates in about 3 seconds. The release of relay 10TS after relay 4PC1 has operated connects an operating ground to relay 4PC1A through released armature 4 of relay 10TS, conductor 180, released armature 1 of relay 4PC2, conductor 181, operated armature 1 of relay 4PC1, and conductor 182. Relay 4PC1A locks to armature 3 of relay 4FN through operated armature 2 of relay 4PC1A, conductor 177, unoperated armature 4' of relay 4ENT, and conductor 178. When relay 4TM4 operates it closes a path to permit operating ground to be applied to relay 4PC2 on the next operation of relay 10TS. This path is from the winding relay 4PC2 through conductor 183, operated armature 2 of relay 4BT, conductor 184, the operated armature of relay 4TM4, conductor 185, operated armature 1 of relay 4BT, conductor 186, operated armature 1 of relay 4PC1A, conductor 175, operated armature 2 of relay 4SOT, conductor 176 to the inner contact associated with armature 4 of relay 10TS. The operation of relay 4PC2 breaks the connection between conductors 171 and 172 and thereby releases relay 8SP by removing its operating ground. Since relay 8SP was operated for about 3 seconds, approximately 20 lines of splice pattern were perforated. The release of relay 10TS during the perforation of the last line of splice pattern connects operating ground to relay 4ENT through armature 5 of relay 10TS, conductor 172, operated armature 3 of relay 4PC2, conductor 187, operated armature 6 of relay 4BT, conductor 188, unoperated armature 2 of relay 4EOT, and conductor 189. Relay 4ENT locks to relay 4EOT through armature 4 of relay 4ENT, conductor 190, operated armature 1 of relay 4TP, conductor 191, and released armature 3 of relay 4EOT to ground. When relay 4ENT operates it unlocks relays 4PC1, 4PC1A, and 4PC2 by breaking the connection between conductors 177 and 178, and it releases relay 4BT by breaking the connection between conductors 165 and 166. The operation of relay 4ENT also serves to connect the negative terminal of battery 448 to elements 1, 4 and 5 of tube 3T5 through resistor 4BR, the unoperated armature of relay 4AL, conductor 192, operated armature 3 of relay 4ENT, and conductor 193. The operation of relay 4ENT also serves to connect operating ground to stepping magnet 2SM through conductor 197, operated armature 2 of relay 3TOT, conductor 198, the winding of relay 4AL, conductor 194, operated armature 2 of relay 4ENT, conductor 195, released armature 1 of relay 10TS, conductor 196, operated armature 2 of relay 4ERA, conductor 203, and operated armature 3 of relay 4ER to ground. The operation of relay 4ENT also connects operating ground to relay 4TPL through operated armature 4'', and conductor 199. The release of relay 4PC1A releases relay 4SOT by removing the ground that was connected to conductor 164 by armature 3 of relay 4PC1A, and the release of relay 4SOT serves to connect operating ground to relay 7DCA as follows: from the winding of relay 7DCA through conductor 200, the operated chain relay circuit 7HC1 to 7HC6, conductor 201, operated armature 4''' of relay 4ENT, conductor 202, unoperated armature 1 of relay 4SOT, conductor 172, and released armature 5 of relay 10TS to ground.

The AMA tape has now been perforated with several lines of splice pattern so that the tape is properly meshed and feeding smoothly. Also, a line of skip-splice pattern and about 20 additional lines of splice pattern have been perforated. The teletypewriter tape bearing the 6-unit permutation code has been inserted in the tape transmitter and the apparatus is now ready to perform the translation.

*Translating teletypewriter tape*

With relays 4ER and 4ERA operated as previously described, operating ground is connected to transmitter start magnet 2SM. The operation of this electromagnet disengages stop arm 2SA from the peripheral shoulder on cam 2SC, and main shaft 2MS is permitted to rotate under the influence of the electric motor which is coupled to the main shaft through a clutch and a worm gear.

Main shaft 2MS is rotated at a speed which requires about 54 milliseconds for a complete rotation. When the main shaft is at rest, the cams are positioned so that operating lever 2OL and the rotors of contacts 2AC and 2UC are at rest, and the sensing pins are presented to the tape. Cam 2ACC is positioned so as to cause contacts 2AC to be open during a 25 millisecond interval beginning 1 millisecond after shaft 2MS starts to revolve. Cam 2OC is positioned so as to operate lever 2OL and bail 2OB and thereby cause the sensing pins to be presented to the tape during a 23 millisecond interval beginning 2 milliseconds after shaft 2MS starts to revolve. The action of cam 2OC upon lever 2OL and bail 2OB causes the tape to be stepped immediately after the sensing pins are removed each time. Cam 2UCC is positioned so as to cause the rotor of contacts 2UC to connect with the left contact during a 20 millisecond interval beginning about 4 milliseconds after shaft 2MS starts to revolve. The rotor of contacts 2UC is allowed to connect with the right contact during the remaining 34 milliseconds which the shaft rotates. Thus, it will be observed that the voltage which is applied to the plates of the discriminator tubes through the auxiliary contacts is applied only while the pins are sensing a character, the auxiliary contacts opening 1 millisecond before the sensing pins are retracted and closing 1 millisecond after the sensing pins are presented in order to avoid any effects due to movement of the pins.

Each complete rotation of main shaft 2MS results in the withdrawing of the sensing pins, the stepping of the teletypewriter tape, and the presenting of the sensing pins to the teletypewriter tape. Each time a "blank" (i. e. no perforations in the tape) is sensed, tube 5AI of the selector circuit is made conducting, and each time auxiliary contacts 2AC are opened, tube 5AI is restored to its non-conducting condition. Therefore, relay 4ER operates and releases on each "blank" in the tape and the tape is stepped ahead until the first perforated code combination is reached, whereupon relay 4ER releases and in turn releases relay 4ERA by removing its operating ground. Each time an "erase" combination (i. e. all six perforations in the tape) is sensed, tube 6H5 of the selector circuit is made conducting. Since the plate circuits of tubes 5AI and 6H5 are connected, the translator discards the "erase" combination just as it discards the "blank."

The first significant combination in the tape is one of the digits 0, 1, 2, or 3, and the sensing of this combination by the transmitter pins causes the associated selector tube, 5A4, 6EI, 6FI, or 6GI, respectively, to become conducting. This in turn operates relay 9AS0, 9AS1, 9AS2, or 9AS3 through operated relay 7DCA. Thus, one of the relays in the 9AS group is operated and this operated relay locks, extinguishes the selector tube with which it is associated by connecting the plate of the tube to grounded conductor 140, operates relay 9ASC, and connects a ground to conductor 207 if one and only one relay in the 9AS group is operated.

This grounded conductor is connected to start magnet 2SM through the distributor chain relay circuit comprising relays 7HC1 to 7HC6 and through conductor 208, released armature 2 of relay 4ERA, conductor 196, released armature 1 of relay 10TS, conductor 195, operated armature 2 of relay 4ENT, conductor 194, the winding of relay 4AL, conductor 198, operated armature 2 of relay 3TOT, and conductor 197. Thus, the first significant combination in the tape is registered by a relay in the 9AS group, and a verification is sent to the tape transmitter, permitting start magnet 2SM to release main shaft 2M and thereby permit the tape transmitter to step to the second combination in the tape and sense it.

If the first significant combination in the tape is not one of the digits 0, 1, 2, or 3, none of the relays in the 9AS group will operate and the tape transmitter will not be permitted to step to the next combination in the tape. Thus, the translator is adapted to reject all tapes that do not start with a code representation of one of the digits 0, 1, 2, or 3 as the first significant code combination.

As the main shaft revolves, the rotor of universal contacts 2UC moves to the left and to the right once for each combination sensed. This operation of the universal contacts is used to count the number of combinations sensed. The rotor of these contacts is connected to ground when the transmitter is at rest, and it is transferred to connect to battery 2120 through resistor 2DR about 4 milliseconds after the main shaft starts moving. In this manner the potential of battery 2120 is applied to condenser 7HC1C through conductor 209, armature 1 of released relay 4ERA, conductor 210, armature 1 of released relay 4ER, conductor 205, resistor 1JR, and conductor 206. This connection between battery 2120 and condenser 7HC1C is maintained for about 20 milliseconds and serves to raise the potential of the grid of thyratron tube 7HC1T to the point where the tube is permitted to become conducting thereby drawing current through and operating relay 7HC1. The operation of this relay transfers the operating ground applied through armature 1 of relay 7HC1 from conductor 200 to conductor 212 thereby releasing relay 7DCA and operating relay 7DCB. The operation of relay 7HC1 also disconnects conductor 207 from electromagnet 2SM and connects conductor 213 to the electromagnet. The release of relay 7DCA breaks the connections between the plate circuits of the selector tubes and the relays in group 9AS. The rotor of contacts 2UC is connected to ground during the last 30 milliseconds of the rotation of the main shaft so as to discharge condensers 7HC1C to 7HC6C.

When the next code combination, which may be any digit from 0 to 9 inclusive, is sensed it causes the firing of the associated selector tube, and, since relay 7DCB is operated, causes the operation of one relay in the 9BS group. The operation of one of the relays in this group serves to lock the operated relay, extinguish its associated selector tube, operate relay 9BSC and connect a ground to conductor 213 if one and only one relay in the 9BS group is operated. This ground again operates start magnet 2SM, permitting the tape transmitter to step to the next code combination since the second code combination in the tape has been registered in storage relay group 9BS.

As the transmitter shaft rotates, universal contacts 2UC again connect battery 2120 to conductor 206 and at this time tube 7HC2T is permitted to become conducting, operating relay 7HC2 which releases relay 7DCB and operates 7DCC as well as connecting start magnet 2SM to conductor 214 in the 9CS group of storage relays. This sequence of operations continues until the first six significant combinations in the tape have been registered by the relays of groups 9AS to 10FS.

If a "blank" combination is received during the train of six significant combinations, it results in the operation of relays 4ER and 4ERA as explained hereinbefore. The operation of relay 4ER grounds start magnet 2SM through armature 3 of the relay and disconnects conductor 205 from conductor 210, thereby stepping the teletypewriter tape to the next combination and preventing the distributor circuit from progressing.

When the sixth combination is registered by a relay in the 10FS group and relay 10FSC has operated, operating ground is applied to relay 10J when conductors 129 and 130 are connected through the operated armature of relay 10FSC. When relay 10J operates, operating ground is applied to start electromagnet 2SM through operated armature 1 of relay 10J, conductor 215, operated armature 2 of relay 7HC5, conductor 216, and released armature 2 of relay 7HC6 to conductor 208, and from conductor 208 to electromagnet 2SM as explained hereinbefore. The start magnet is energized and the teletypewriter tape is stepped to the seventh code combination (the first combination of the second line in the AMA tape).

As the main shaft makes its sixth revolution, the rotor of contacts 2UC makes its sixth connection with its left contact and relay 7HC6 operates. The operation of relay 7HC6 connects operating ground to relay 10K by grounding conductor 132 through armature 3 of relay 7HC6, and the operation of relay 10K in turn connects operating ground to relay 10TS through armature 1 of relay 10K, conductor 135, armature 2 of operated relay 10J, and conductor 136. Operated relay 10TS closes a path from ground, releases armature 5 of relay 10PCK, conductor 141, armature 2 of relay 10TS, and conductor 140 which connects operating ground to the relays in groups 13A to 14F which are associated with the operated relays in groups 9AS to 10FS. In turn, the relays in groups 13A to 14F which are thereby operated serve to energize the corresponding check relays and perforator electromagnets. As explained hereinbefore, the operation of the first of the check relays operates relay 14PA which in turn operates relay 14PAC, and the closure of the chain through all the check relays operates relay 14PCK which in turn releases relays 10FSC and 10J. The operation of relay 14PCK while relay 10TS is operated serves to unlock the operated relay in each of the 9AS to 10FS groups, thereby releasing relays 9ASC to 10ESC and relay 10K. With relay 10K released, operated relay 14PCK serves to operate relay 7HCR by closing an electrical path from ground through operated armature 3 of relay 14PCK, conductor 216, released armature 3 of relay 10K, conductor 217, the winding of relay 7HCR, and battery 748 to ground. The operation of relay 7HCR serves to release relays 7HC1 to 7HC6.

With relays 7HC1 to 7HC6 and relay 10TS released, a path is completed for the reoperation of relay 7DCA and selector tubes 5A4, 6E1, 6G1, and 6F1 are again connected to the relays in group 9AS. As before, one of these relays operates and connects operating ground to electromagnet 2SM which causes the teletypewriter tape to be stepped to the next code combination, the tape transmitter senses this code combination and the information is registered in one of the storage relays in the 9BS groups.

While the operation described above is taking place, the line of the AMA tape corresponding to the first six combinations in the teletypewriter tape is perforated, the perforating pins withdrawn and the AMA tape stepped in the same manner as that described for the perforation of splice pattern, and when relay 14PCK is released after the operation of relay 10TM3, operating ground is connected through conductor 141 to relay 10FSC when the sixth code combination of the second line is registered in storage relay group 10FS. The registration of this code combination in storage relay group 10FS causes the operation of relays 10J and 10TS as before, and the operation of relay 10TS serves to transfer the information registered in storage relay groups 9AS to 10FS to relays in the 9A to 10F groups. It will be observed that the registration in the storage relays of the code characters of a line of AMA tape takes place while the perforator pins are dwelling in the tape after perforating the previous line, while the pins are being withdrawn, and while the tape is being stepped. Therefore, several code characters of the next line of the AMA tape may be registered in the storage relays before the perforator has completed the perforation of the previous line.

When the last six code characters of the teletypewriter tape have been registered as the last line of AMA tape, the "blank" combinations at the end of the teletypewriter tape are stepped out, as previously described, and when the end of the teletypewriter tape is reached, contacts 2TOC of the tape transmitter open. When contacts 2TOC open, the operating ground of relay 3TOT is disconnected and the release of relay 3TOT serves to operate relay 4EOT by connecting operating ground to its winding through armature 1 of relay 3TOT, conductor 219, operated armature 1 of relay 4TPL, and conductor 220. The release of relay 3TOT also serves to connect battery 348 to cathode 3 of tube 3T5 through resistor 3R, armature 3 of relay 3TOT, and conductor 191. After about 8 seconds relay 3TM5 operates and connects operating ground to relay 3TTOA through conductor 103, released armature 4 of relay 3TOT, and conductor 195. The operation of relay 3TTOA serves to light the "TTY tape out" lamp.

*Perforating skip-splice and splice pattern at end of tape*

The operation of relay 4EOT connects operating ground to relay 4BT through released armature 3 of relay 4FN, conductor 176, armature 1 of relay 4EOT, and conductor 165. Also, operating ground is connected to relay 4AK through armature 4 of relay 4EOT and conductor 221, and relay 4ENT is unlocked when the connection between armature 3 of relay 4EOT and conductor 191 is broken. As previously described, the operation of relay 4BT operates relay 8SKS, which results in the perforation of a line of skip-splice pattern. After relay 10TS operates relay 4PC1, relay 8SKS is released and relay 8SP is operated, which results in the perforation of about 20 lines of splice pattern. When 4TM4 operates, relay 4PC2 is operated and relay 8SP is released. The release of relay 10TS now results in the operation of relay 4FN since operating ground is connected to relay 4FN through released armature 5 of relay 10TS, conductor 172, operated armature 3 of relay 4PC2, conductor 187, operated armature 6 of relay 4BT, conductor 188, operated armature 2 of relay 4EOT, and conductor 222. When relay 4FN operates, relays 4AK, 4TPL, 4TP, 4PC1, 4PC1A, and 4PC2 are unlocked and relays 4BT and 4EOT are released. The translator is now ready for the processing of another teletypewriter tape.

*Alarm circuit*

As previously described, relay 4ENT is operated during the perforation of the last line of splice pattern. While relay 4ENT is operated, the armature of relay 4AL is connected to elements 1, 4, and 5 of tube 3T5 through conductor 192, operated armature 3 of relay 4ENT, and conductor 193. This connection serves to connect the negative terminal of grounded battery 448 to elements 1, 4, and 5 of tube 3T5 when relay 4AL is released. The winding of relay 4AL is one element of the electrical path which connects operating ground to electromagnet 2SM; therefore the armature of relay 4AL is operated each time electromagnet 2SM is energized. The timing circuit comprising tube 3T5, relay 3TM5, condenser 3C5, and resistor 3A5R is designed to operate relay 3TM5 if the negative terminal of battery 448 is not connected to elements 1, 4, and 5 of the tube for a period of about 8 seconds. Therefore, if electromagnet 2SM is not energized for about 8 seconds, the timing circuit will cause relay 3TM5 to operate. With relay 3TOT operated, the operation of relay 3TM5 will connect operating ground to relay 3TTSA, and the operation of relay 3TTSA serves to light the "TTY tape stop" lamp, thereby indicating that the translator has ceased to operate.

Although a specific embodiment of this invention has been shown and described, it will be understood that modifications may be made therein without departing from the scope and spirit thereof as defined by the appended claims.

What is claimed is:

1. A translating device comprising a controlling instrument including means for sensing a plurality of conditions on a record indicating characters expressed in a first system of coding, a controlled instrument including recording means for producing representations of said characters in one line of a record medium expressed in a second system of coding, and interconnecting means for operating said controlled instrument for each operation of said controlling instrument, said interconnecting means comprising a selector circuit selectively responsive to the sensing of each character condition by said controlling instrument, a plurality of registers each settable from said selector to store character conditions in said second system of coding, means responsive to the setting of said registers for operating said recording means in said controlled instrument, and a distributor operated by said controlling instrument at each sensing operation thereof for connecting said selector consecutively with each one of said plurality of registers, thereby to cause said selector to operate said connected register.

2. A translator comprising a controlling instrument including means for sensing a record having character conditions thereon expressed in a first system of coding, a controlled instrument including means for producing in a line of a record medium representations of said character expressed in a second system of coding, interconnecting means for operating said controlled instrument in response to the operation of said controlling instrument sensing said character conditions, and means responsive to said controlling instrument sensing a blank portion of the record for operating said controlled instrument to automatically produce representations of certain predetermined characters in said second system of coding.

3. A translator comprising a controlling instrument including means for sensing a record having character conditions thereon expressed in a first system of coding, a controlled instrument including means for producing in a line of a record medium representations of said characters expressed in a second system of coding, interconnecting means for operating said controlled instrument in response to the operation of said controlling instrument sensing said character conditions, and a control device for operating said controlled instrument independently of said controlling instrument for producing representations of predetermined characters in said second system of coding in response to the operation of said control device.

4. A translator according to claim 1 wherein certain character conditions sensed by said controlling instrument express certain predetermined characters and wherein one of said plurality of registers comprises means responsive only to the registration of said predetermined characters expressed in said second system of coding, means responsive to the operation of said register for checking the registration of one of said predetermined characters in said register, and means in said controlling instrument responsive to said checking means for preventing further operation of said controlling instrument in the event that the character registered in said register is other than one of said predetermined characters.

5. A code translator according to claim 1 wherein said distributor circuit comprises a plurality of distributor relays, each distributor relay being connected to one of said registers, and a counting circuit, said counting circuit being adapted to control said distributor relays, to respond progressively to each operation of said controlling device and to respond in repeated cycles of operation, each cycle corresponding to each condition sensed by said controlling device.

6. A code translator for translating character conditions expressed in a first system of coding to character conditions expressed in a second system of coding, comprising a controlling instrument including means for sensing a record containing character conditions expressed in said first system of coding, a selector circuit comprising a plurality of devices selectively responsive to the sensing of each of said character conditions by said controlling instrument, each of said devices being respectively responsive to the sensing by said controlling instrument of the condition expressing one character, and each of said devices comprising two groups of discriminator thermionic tubes and a selector thermionic tube for each pair of discriminator thermionic tubes, each discriminator tube being so connected to said controlling device that one discriminator tube in each of said groups operates in response to each character condition sensed by said controlling device, and each selector thermionic tube being so connected to said discriminator tubes that a predetermined selector tube operates in response to the operation of a predetermined discriminator tube in each group, and a recording device including a plurality of magnets selectively responsive to each of said devices for recording on one line of a record medium conditions expressing said characters in said second system of coding.

DAVID E. BRANSON.
JAMES R. DAVEY.
GEORGE J. KNANDEL.
GEORGE A. LOCKE.
RICHARD A. VANDERLIPPE.

REFERENCES CITED

The following references are of record in the file of this patent:

UNITED STATES PATENTS

| Number | Name | Date |
|---|---|---|
| 1,394,439 | Murray | Oct. 18, 1921 |
| 2,352,952 | Haglund | July 4, 1944 |
| 2,370,989 | Nichols | Mar. 6, 1945 |